(12) United States Patent
Jung et al.

(10) Patent No.: US 11,540,627 B2
(45) Date of Patent: Jan. 3, 2023

(54) SERVING MODULE AND ROBOT HAVING THE SAME

(71) Applicant: LG ELECTRONICS INC., Seoul (KR)

(72) Inventors: Chungin Jung, Seoul (KR); Sunho Yang, Seoul (KR); Eulpyo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 354 days.

(21) Appl. No.: 16/628,218

(22) PCT Filed: Jan. 2, 2019

(86) PCT No.: PCT/KR2019/000034
§ 371 (c)(1),
(2) Date: Jan. 2, 2020

(87) PCT Pub. No.: WO2020/141622
PCT Pub. Date: Jul. 9, 2020

(65) Prior Publication Data
US 2021/0212455 A1    Jul. 15, 2021

(51) Int. Cl.
*A47B 31/00* (2006.01)
*E05F 15/60* (2015.01)
(Continued)

(52) U.S. Cl.
CPC .............. *A47B 31/00* (2013.01); *A47F 10/06* (2013.01); *B25J 5/007* (2013.01); *B25J 9/0003* (2013.01);
(Continued)

(58) Field of Classification Search
CPC .............. A47B 31/00; A47B 2031/002; A47B 2031/007; A47F 10/06; B25J 5/007;
(Continued)

(56) References Cited

U.S. PATENT DOCUMENTS 3,997,028 A * 12/1976 Lopez .................... A47B 31/02
186/44
5,205,630 A * 4/1993 Welch .................. A47B 47/021
211/187
(Continued)

FOREIGN PATENT DOCUMENTS

CN        107838930 A      3/2018
CN        207480601 U      6/2018
(Continued)

*Primary Examiner* — Saul Rodriguez
*Assistant Examiner* — Ashley K Romano
(74) *Attorney, Agent, or Firm* — Birch, Stewart, Kolasch & Birch, LLP

(57) ABSTRACT

According to the present embodiment, a serving module includes: a tray; a main body formed therein with a tray space configured to accommodate the tray and having a tray entrance; a tray moving device configured to move at least a part of the tray out of the tray entrance or move an entire of the tray into the tray space; a door configured to open and close the tray entrance; and a door driving device connected to the door to open and close the door.

3 Claims, 16 Drawing Sheets

(51) Int. Cl.
*B60Q 3/30* (2017.01)
*A47F 10/06* (2006.01)
*B25J 5/00* (2006.01)
*B25J 9/00* (2006.01)
*B25J 11/00* (2006.01)
*B60P 1/02* (2006.01)
*G07C 9/00* (2020.01)
*E05F 15/608* (2015.01)

(52) U.S. Cl.
CPC ............... *B60P 1/02* (2013.01); *B60Q 3/30* (2017.02); *E05F 15/608* (2015.01); *A47B 2031/002* (2013.01); *A47B 2031/007* (2013.01); *B25J 11/008* (2013.01); *B25J 11/0045* (2013.01); *G07C 9/00896* (2013.01)

(58) Field of Classification Search
CPC .... B25J 9/0003; B25J 11/0045; B25J 11/008; B60P 1/02; G07C 9/00896; B60Q 3/30; E05F 15/608
See application file for complete search history.

(56) References Cited

U.S. PATENT DOCUMENTS

| | | | |
|---|---|---|---|
| 10,045,829 B1* | 8/2018 | Norman | A61M 5/1417 |
| 11,158,145 B2* | 10/2021 | Beck | G07C 9/00 |
| 2014/0190286 A1* | 7/2014 | Aeppli | F16H 37/041 |
| | | | 74/63 |
| 2015/0012163 A1 | 1/2015 | Crawley | |
| 2017/0129099 A1 | 5/2017 | Alduaiji et al. | |
| 2017/0312916 A1 | 11/2017 | Williams et al. | |
| 2018/0158317 A1* | 6/2018 | Pleasants | E05F 15/668 |
| 2018/0364870 A1* | 12/2018 | Mei | B25J 11/0005 |
| 2019/0105120 A1* | 4/2019 | Norman | A61M 5/1417 |
| 2019/0293255 A1* | 9/2019 | Meijers | B60Q 3/20 |
| 2020/0094736 A1* | 3/2020 | Augusty | B60Q 1/30 |
| 2020/0206946 A1* | 7/2020 | Bondaryk | B25J 9/0087 |
| 2020/0290217 A1* | 9/2020 | Chernyak | B25J 19/002 |

FOREIGN PATENT DOCUMENTS

| | | |
|---|---|---|
| KR | 10-2011-0136930 A | 12/2011 |
| KR | 10-2012-0010445 A | 2/2012 |

\* cited by examiner

SERVING MODULE AND ROBOT HAVING THE SAME

CROSS REFERENCE TO RELATED APPLICATIONS

This application is the National Phase of PCT International Application No. PCT/KR2019/000034, filed on Jan. 2, 2019 in the Republic of Korea, the contents of which are hereby expressly incorporated by reference into the present application.

TECHNICAL FIELD

The present disclosure relates to a serving module and a robot having the same.

BACKGROUND ART

Robots have been developed for industrial use in order to serve as a part of factory automation. Recently, industrial fields employing the robots have been extensively increased, so that medical robots and aerospace robots as well as robots that can be used in daily life have been developed.

Such daily life robots provide specific services (e.g., shopping, serving, talking, cleaning, etc.) in response to a command of a user.

However, the existing daily life robot is designed to provide only a specific service, so that the utilization against the cost invested for developing the robot is not high.

Accordingly, the demand for a robot that can provide various services has recently emerged.

DISCLOSURE OF THE INVENTION

Technical Problem

Embodiments provide a serving module and a robot having the same, which may service a serving target article to a customer as hygienic as possible and allow the customer or a manager to easily access the article.

Embodiments also provide a serving module and a robot having the same, which may visualize the availability for serving of an article, allowing the serving module to have a high quality.

Technical Solution

In one embodiment, a serving module includes: a tray; a main body formed therein with a tray space configured to accommodate the tray and having a tray entrance; and a door configured to open and close the tray entrance.

The main body may include: a base; a supporter installed on the base; an inner case coupled to the supporter and formed therein with the tray space; and an upper plate coupled to an upper portion of the supporter.

The serving module may further include an inner lighting device which is turned on when the door is opened to emit light into the tray space.

The serving module may further include: an inner cover disposed on an upper portion of the inner case; an inner light emitting device installed on the inner cover; and an inner window configured to face the inner light emitting device and disposed in the inner cover. The inner light emitting device and the inner window may function as the inner lighting device.

The serving module may include an indicator configured to change a lighting pattern according to the door during an operation of the door. The indicator may be disposed on the main body. The indicator may be disposed on an upper portion of the upper plate.

The serving module may further include: an outer light emitting device disposed on the upper plate; a top cover configured to cover the upper plate and the outer light emitting device and formed at one side thereof with a light transmitting portion; and an outer window disposed in the light transmitting portion and configured to transmit light emitted from the upper light emitting device. The outer light emitting device, the top cover, and the outer window may function as the indicator.

The indicator may include a plurality of light sources.

The light sources may be sequentially turned on or off in a moving direction of the door.

As one example, all the light sources may be maintained in an ON state when the door is closed, and the light sources may be sequentially turned on in a direction parallel to an opening direction of the door when the door is rotated in the opening direction of the door. In this case, a size of the lighting pattern formed by the indicator may be gradually decreased in the opening direction of the door.

As another example, all the light sources may be maintained in an OFF state when the door is fully opened, and the light sources may be sequentially turned on in a direction parallel to a closing direction of the door when the door is rotated in the closing direction of the door. In this case, the size of the lighting pattern formed by the indicator may be gradually increased in the closing direction of the door.

The light sources may be sequentially turned on and then turned off in the moving direction of the door. All the light sources may be maintained in the OFF state when the door is closed, and the light sources may be sequentially turned on and then turned off in the direction parallel to the opening direction of the door when the door is rotated in the opening direction of the door.

All the light sources may be maintained in the OFF state when the door is fully opened, and the light sources may be sequentially turned on and then turned off in the direction parallel to the closing direction of the door when the door is rotated in the closing direction of the door.

When the light sources are sequentially turned on and then turned off, the light sources may be turned on and then turned off in a unit of a predetermined number of light sources, and the lighting pattern formed by the indicator may be configured such that a position of the lighting pattern is gradually moved along with the door while keeping the size thereof.

The serving module may further include a tray moving device configured to move at least a part of the tray out of the tray entrance or move an entire of the tray into the tray space. A plurality of trays may be provided inside the main body, and the tray moving device may be provided for each tray.

The serving module may further include a door driving device connected to the door to open and close the door.

The serving module may further include an outer cover configured to cover the supporter, the inner case, the tray moving device, and the door driving device.

The tray moving device may include: a tray motor mounted on the main body; a driving link connected to the tray motor; and a driven link connected to the driving link. The tray moving device may include a tray carrier on which the tray is placed.

The door driving device may include: a door motor; a driving pulley connected to the door motor; a driven pulley spaced apart from the driving pulley; a belt wound around the driving pulley and the driven pulley; a rotor connected to the driven pulley; and a rotor supporter configured to rotatably support the rotor. The door may be connected to the rotor. The rotor may include a driven pulley connection body connected to the driven pulley and a door connection body connected to the driven pulley connection body. The door may be connected to the door connection body.

The door driving device may further include at least one sliding guide installed on the rotor supporter to guide a linear movement of the tray.

A robot having a serving module may include: the serving module; and a moving module, wherein the moving module may include a module support plate on which the serving module is seated and a display unit disposed higher than the module support plate.

The main body may further include a moving module connector detachably attached to the moving module. A plurality of trays may be provided inside the body, and the door, the door moving device, and the tray moving device may be provided for each tray.

At least one of the moving module or the serving module may include a controller.

The controller may control the tray moving device in a serving mode after the door has been opened by the door driving device.

At least one of the moving module or the serving module may include an authentication module configured to authenticate a customer who ordered an article of the tray.

The controller may control the door driving device in an open mode and control the tray moving device in the serving mode when the customer authentication is completed by the authentication module.

Advantageous Effects

According to embodiments, an article placed on the tray can be protected by the main body and the door, so that the article can be served to the customer in a state where the article is maintained as hygienic as possible.

In addition, the tray can be moved out of the tray entrance through the tray entrance, so that it is unnecessary to put a hand deep into the tray space to grab the tray or the article placed on the tray by the hand, and the customer or a service provider can access the article more easily, thereby improving convenience.

In addition, the inner case having the tray space can be firmly supported by the supporter.

In addition, the tray space can be lightened by the light emitted from the inner light emitting device, so that a serving service of the serving module can be visualized.

In addition, the light is emitted to the tray space when the door is opened, so that the customer or the service provider can easily recognize the start of serving of the serving module.

In addition, the outer cover covers the supporter, the inner case, the tray moving device, and the door driving device, allowing an exterior to have a high quality.

In addition, the tray moving device includes the tray motor, the driving link, and the driven link, so that the tray moving device can move the tray at a periphery of the inner case. Thus, the space utility can be improved at locations above or under the tray space, and the serving module can be made in a compact size.

In addition, in the tray moving device, the tray carrier on which the tray is placed can be connected to the driven link so that the tray can be separated from the tray moving device, and the tray can be drawn out of the tray space and cleaned when the tray is contaminated so that the tray can be hygienically maintained.

In addition, the door driving device includes the door motor, the driving pulley, the driven pulley, the belt, the rotor, and the rotor supporter, so that the door motor can be disposed in a position other than above or under the tray space. Thus, the space utility can be improved at locations above or under the tray space, and the serving module can be made in a compact size.

In addition, the sliding guide of the door driving device guides the linear movement of the tray carrier, so that the door can be rotated while the tray is linearly moved with the minimum number of components.

In addition, the lighting pattern of the indicator is changed according to a position of the door during an operation of the door, so that the customer or the service provider can easily recognize the opening of the door, the closing of the door, and the moving direction of the door, and can easily recognize the start of serving of the serving module.

In addition, the serving module can be separated from the moving module so that the serving module can be serviced or stored separately from the moving module.

In addition, a plurality of trays can be selectively moved, so that the serving module can return to an article supplier after sequentially serving various articles to a plurality of customers, power consumption of the moving module can be minimized, and an overall time for providing a serving service to a plurality of customers can be reduced.

In addition, the tray is moved after the door has been opened, so that damages to the door, the tray, or the article that may occur when the tray is moved in a state in which the door has not been opened can be minimized.

In addition, when the customer who ordered an article is authenticated by the authentication module, the door is opened, and the tray is moved to a serving position, so that the article can be reliably served to an actual customer who ordered the article of the tray.

MODE FOR CARRYING OUT THE INVENTION

Hereinafter, embodiments of the present disclosure will be described in detail with reference to the accompanying drawings.

Figure 1:
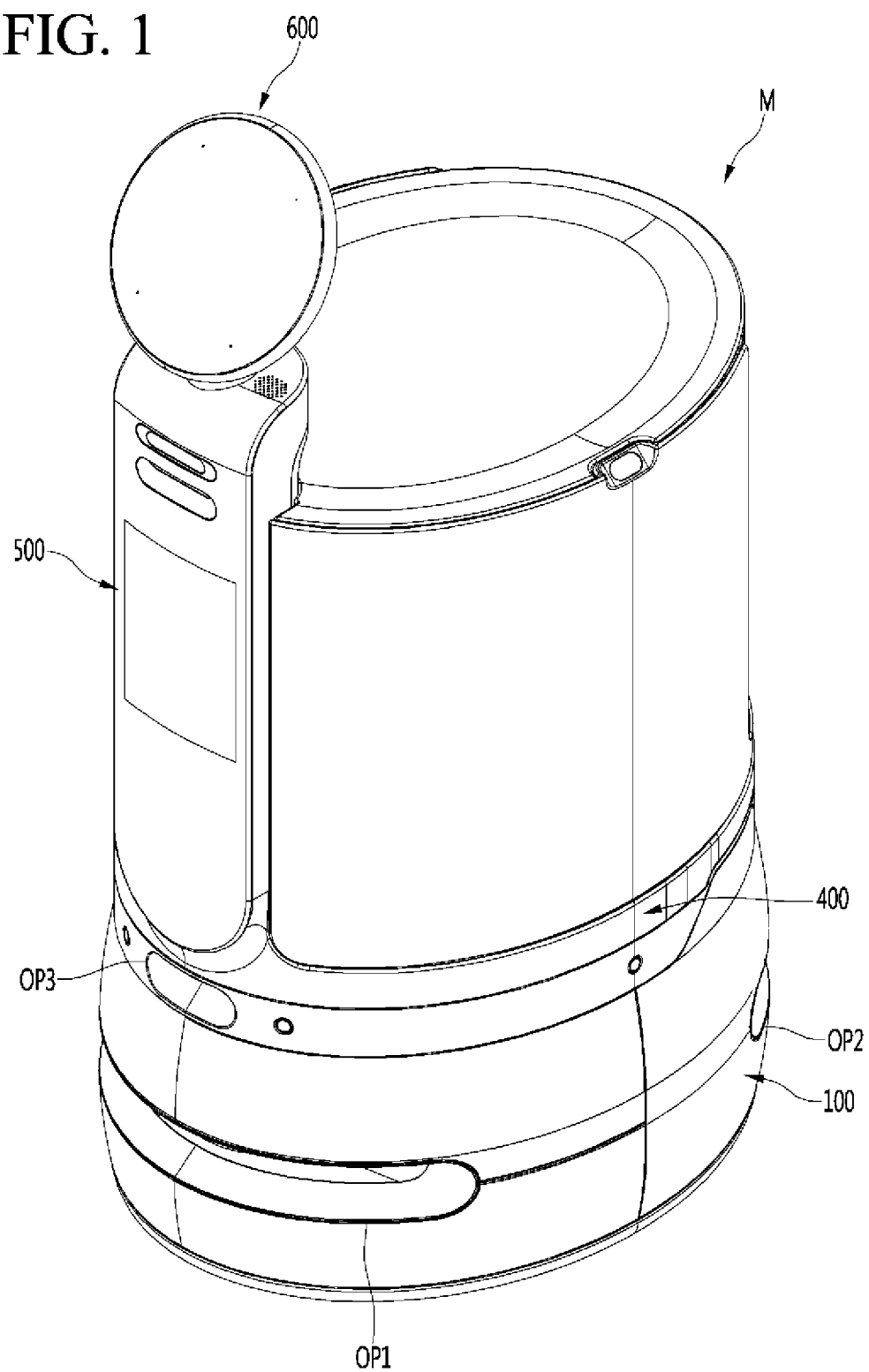
FIG. 1 is a perspective view showing a serving module and a robot having the same according to an embodiment.
Figure 2:
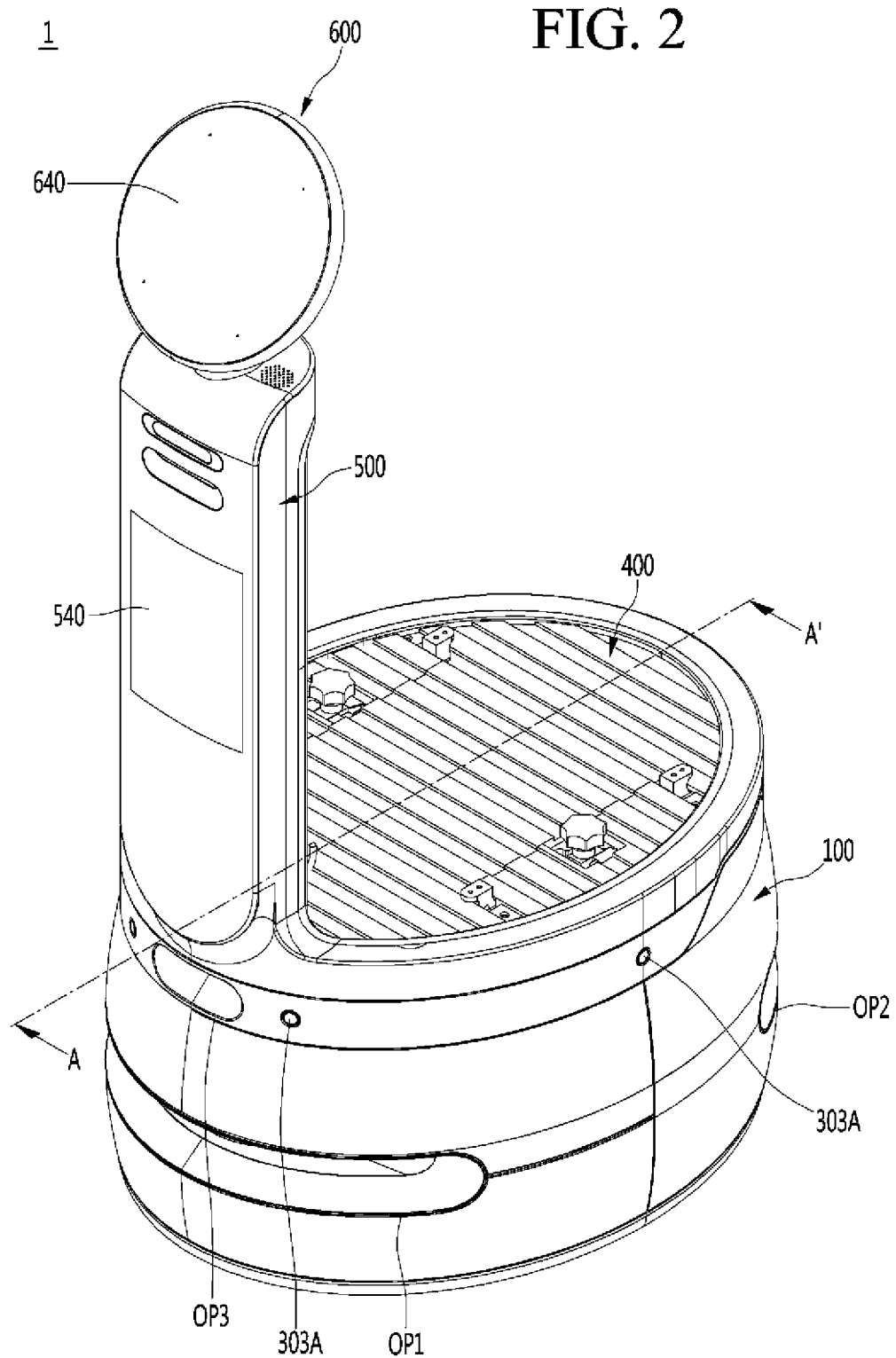
FIG. 2 is a perspective view of a moving module shown in FIG. 1.
Figure 3:
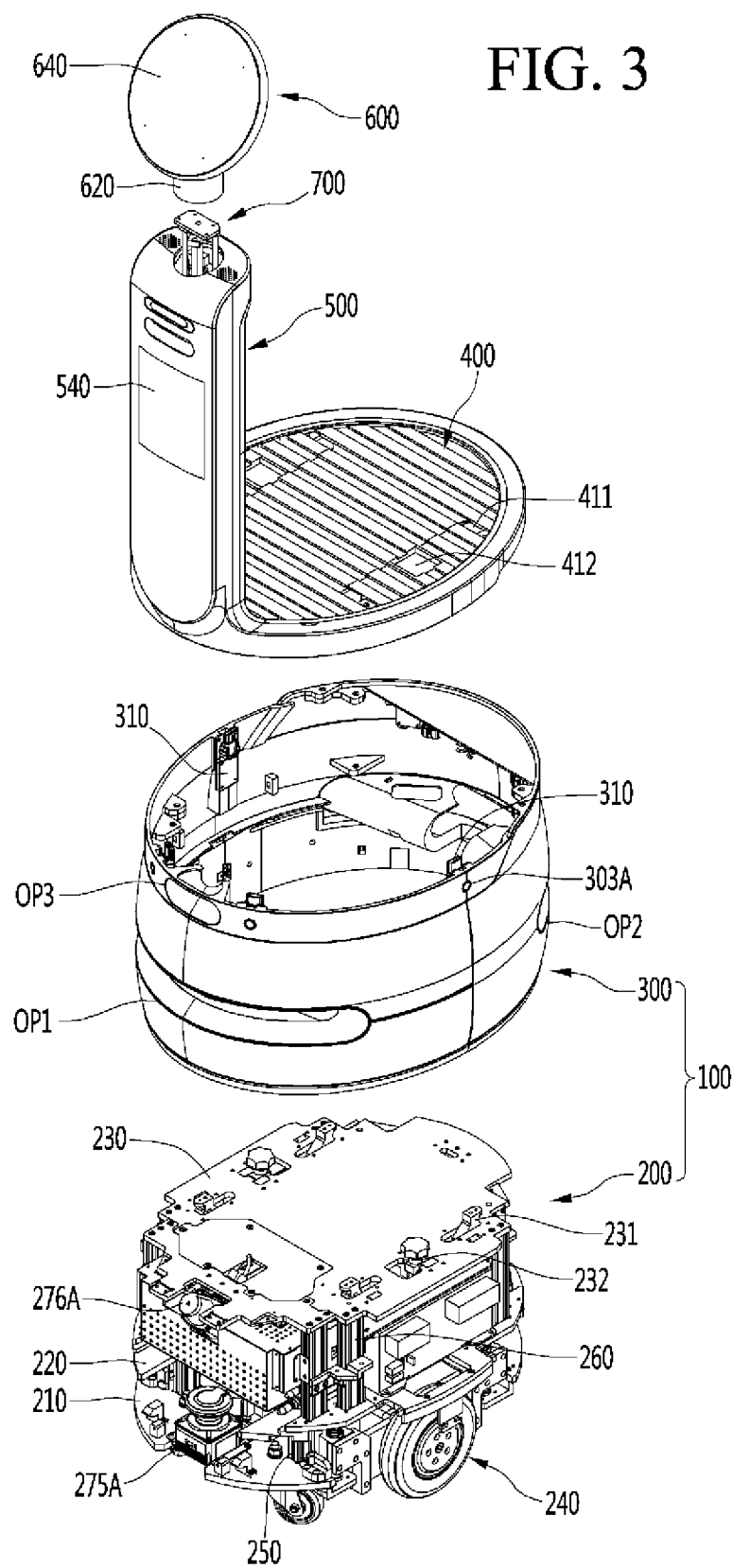
FIG. 3 is an exploded perspective view of the moving module shown in FIG. 2.

FIG. 1 is a perspective view showing a serving module and a robot having the same according to an embodiment, FIG. 2 is a perspective view of a moving module shown in FIG. 1, and FIG. 3 is an exploded perspective view of the moving module shown in FIG. 2.

A serving module M according to the present embodiment may be a module configured to serve an article in accommodations such as a hotel or restaurants such as a cafeteria, and the serving module M may be configured to hygienically and safely serve a serving target article to a user.

One example of the serving module M may be provided separately from a moving module 1, and may be detachably coupled to the moving module 1 for use.

The serving module M may be placed on the moving module 1, moved together with the moving module 1 while the moving module 1 moves, and conveyed by the moving module 1.

When the serving module M is coupled with the moving module 1, an assembly of the serving module M and the moving module 1 may be a robot, and the robot may be a serving robot or a service robot configured to serve an article to a customer.

One example of the robot may provide a room service (towel serving, bath product serving, food serving, etc.) to a guest at places such as a hotel or a resort, or may guide the guest to a room.

In addition, another example of the robot may provide a serving service (e.g., water serving, food serving, menu board provision, etc.) to a guest at places such as a restaurant or a banquet hall.

Hereinafter, the moving module 1 will be described first, and then the serving module M will be described.

Hereinafter, the moving module 1 will be described first, and then the serving module M will be described.

The moving module 1 may include a body 100, a traveling unit 240, a module support plate 400, display units 500 and 600, and a rotation mechanism 700.

The body 100 may constitute a body of the moving module 1.

A length of the body 100 in a front-rear direction may be longer than a width of the body 100 in a left-right direction. For example, a horizontal section of the body 100 may have a substantially elliptical shape.

The body 100 may include an inner module 200 and a housing 300 surrounding the inner module 200.

The inner module 200 may be disposed inside the housing 300. The traveling unit 240 may be provided on a lower portion of the inner module 200.

The inner module 200 may include a plurality of plates and a plurality of frames. In more detail, the inner module 200 may include a lower plate 210, an upper plate 220 disposed above the lower plate 210, and a top plate 230 disposed above the upper plate 220. In addition, the inner module 200 may further include a plurality of lower supporting frames 250 and a plurality of upper supporting frames 260.

The lower plate 210 may constitute a bottom surface of the body 100. The lower plate 210 may be referred to as a base plate. The lower plate 210 may be horizontal. The lower plate 210 may be provided with the traveling unit 240.

The upper plate 220 may be spaced upward from the lower plate 210. The upper plate 220 may be referred to as a middle plate. The upper plate 220 may be horizontal. The upper plate 220 may be disposed between the lower plate 210 and the top plate 230 in a vertical direction.

The lower supporting frame 250 may be disposed between the lower plate 210 and the upper plate 220. The lower supporting frame 250 may extend vertically. The lower supporting frame 250 may support the upper plate 220 from a bottom of the upper plate 220.

The top plate 230 may constitute a top surface of the body 100. The top plate 230 may be spaced upward from the upper plate 220.

The upper supporting frame 260 may be disposed between the upper plate 220 and the top plate 230. The upper supporting frame 260 may extend vertically. The upper supporting frame 260 may support the top plate 230 from a bottom of the top plate 230.

The housing 300 may constitute an outer circumferential surface of the body 100. The housing 300 may be formed therein with a space in which the inner module 200 is disposed. The housing 300 may have an open top and an open bottom.

The housing 300 may surround edges of the lower plate 210, the upper plate 220, and the top plate 230. In this case, an inner circumference of the housing 300 may make contact with the edges of the lower plate 210, the upper plate 220, and the top plate 230, but the embodiment is not limited thereto.

The housing 300 may have a plurality of openings 303A. In more detail, the openings 303A may be formed in an upper portion of the housing 300. The openings 303A may be spaced apart from each other in a circumferential direction of the housing 300. An ultrasonic sensor 310 may detect an object around the moving module 1 through the openings 303A of the housing 300.

The housing 300 may include a material having a first thermal conductivity, and the inner module 200 may include a material having a second thermal conductivity which is higher than the first thermal conductivity. In more detail, at least one of the lower plate 210, the upper plate 220, the top plate 230, the lower supporting frame 250, or the upper supporting frame 260 may include a material having the second thermal conductivity which is higher than the first thermal conductivity.

For example, the housing 300 may include an injection plastic material, and at least one of the lower plate 210, the upper plate 220, the top plate 230, the lower supporting frame 250, or the upper supporting frame 260 may include a metal material such as aluminum.

Accordingly, while heat is smoothly dissipated from a heat generating component disposed on the inner module 200 through conduction, the housing 300 constitute an exterior of the body 100 may be prevented from becoming hot.

The traveling unit 240 may allow the moving module 1 to travel. The traveling unit 240 may be provided on a lower portion of the body 100. In more detail, the traveling unit 240 may be provided on the lower plate 210.

Meanwhile, the module support plate 400 may be mounted on the top surface of the body 100. The module support plate 400 preferably has a horizontal plate shape, but the embodiment is not limited thereto.

Similar to the body 100, a length of the module support plate 400 in the front-rear direction may be longer than a width of the module support plate 400 in the left-right direction.

The module support plate 400 may support the serving module M from a bottom of the serving module M. In other words, the serving module M may be seated and supported by the module support plate 400.

The serving module M may be detachably mounted on the module support plate 300.

The serving module M may be a conveyance target object conveyed by the moving module 1, and types of the serving module M are not limited. Therefore, there is an advantage that different serving modules M can be mounted on the same moving module 1 for use.

On the top surface of the body 100, that is, on the top plate 230, at least one of at least one module guide 231 configured to guide an installation position of the serving module M or at least one module fastening portion 232 fastened to the serving module M may be provided.

The module guide 231 and the module fastening portion 232 may protrude upward from the top plate 230.

The module guide 231 may pass through a sub-through-hole 411 formed in the module support plate 400, guide the installation position of the serving module M, and simultaneously prevent the serving module M from being shaken in a horizontal direction.

The module fastening portion 232 may pass through a sub-open hole 412 formed in the module support plate 400, and may be fastened to the serving module M. Therefore, the serving module M may be firmly mounted on a top of the module support plate 400.

In addition, the module guide 231 and the module fastening portion 232 may be utilized as a handle when the moving module 1 is conveyed.

The display units 500 and 600 may be disposed on an upper front side of the body 100. The display units 500 and 600 may extend vertically.

The display units 500 and 600 may include a body display unit 500 and a head display unit 600.

The body display unit 500 may be integrally formed with the module support plate 400. In this case, the body display unit 500 may extend upward from a front end of the module support plate 400. However, the body display unit 500 and the module support plate 400 may be formed as separate members.

A height of the body display unit 500 may be higher than a height of the body 100.

The body display unit 500 may include a body display 540 provided on a front surface of the body display unit 500. The body display 540 may serve as an output unit configured to display an image or a video. At the same time, the body display 540 may include a touch screen to function as an input unit configured to receive a touch input.

The body display unit 500 may be disposed on a front side of the serving module M mounted on the module support plate 400. In this case, a recess portion corresponding to a shape of the body display unit 500 may be formed in a front portion of the serving module M, and the body display unit 500 may be fitted into the recess portion. In other words, the body display unit 500 may guide a mounting position of the serving module M.

The head display unit 600 may be disposed above the body display unit 500. The head display unit 600 may be rotatably connected to an upper portion of the body display unit 500.

In more detail, the head display unit 600 may include a neck housing 620 rotatably connected to the body display unit 500. The rotation mechanism 700 may pass through an inside of the neck housing 620 to rotate the head display unit 600.

The head display unit 600 may include a head display 640 provided on the front side. The head display 600 may face a front side or an upper front side. The head display 640 may display an image or a video that describes a facial expression of a human. Accordingly, the user may receive an impression that the head display unit 600 is similar to a human head.

The head display unit 600 may rotate right and left about a vertical rotation axis within a predetermined range (e.g., 180 degrees) similarly to the human head.

The rotation mechanism 700 may rotate the head display unit 600 with respect to the body display unit 500. The rotation mechanism 700 may include a rotary motor and a rotation shaft rotated by the rotary motor. The rotary motor may be disposed inside the body display unit 500, and the rotation shaft may extend from an inside of the body display unit 500 into the neck housing 620 and may be connected to the head display unit 600.

Figure 4:
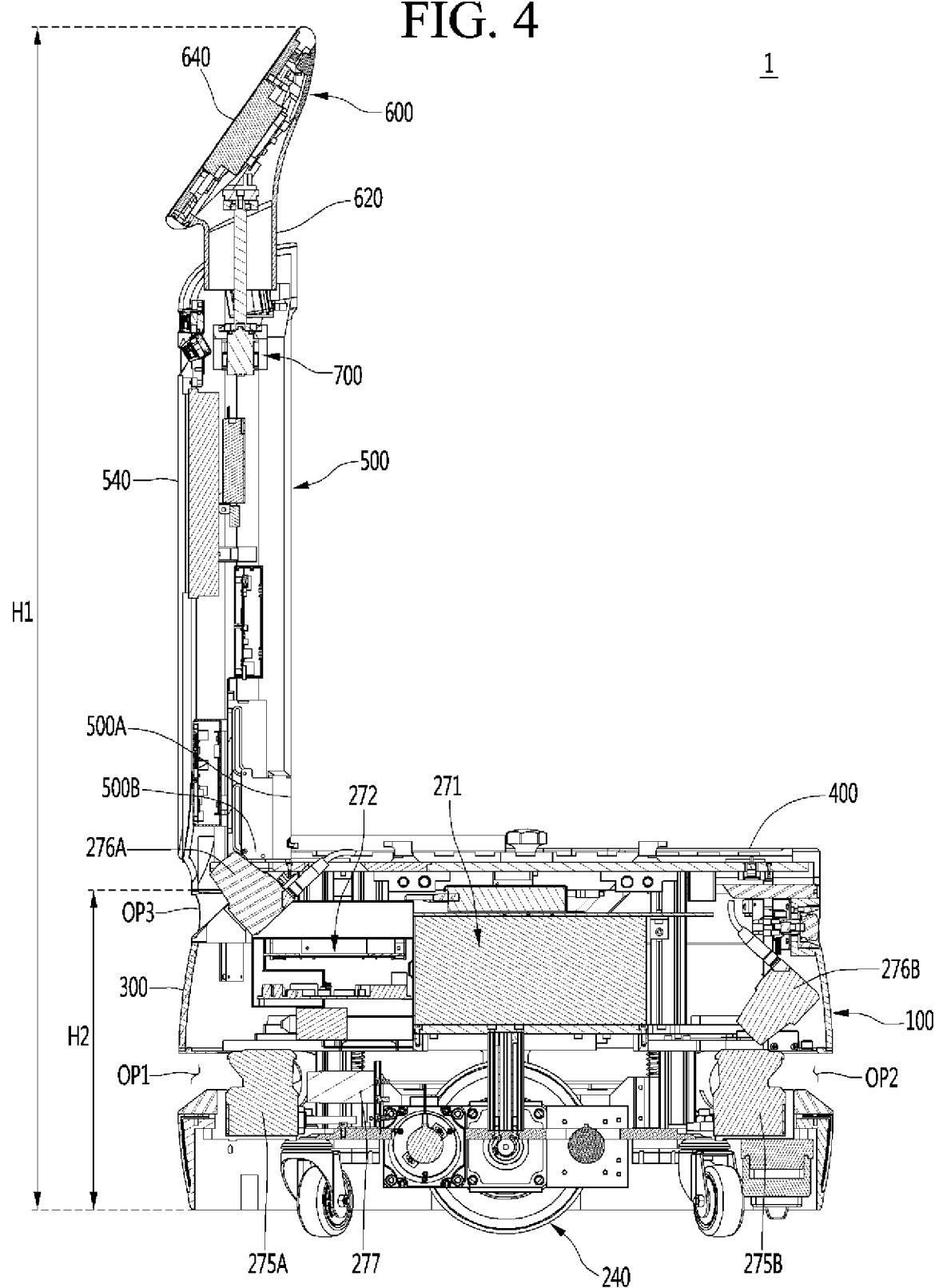
FIG. 4 is a sectional view taken along line A-A' of FIG. 2.

FIG. 4 is a sectional view taken along line A-A' of FIG. 1.

A battery 271 and a control box 272 may be mounted in the body 100.

The battery 271 may store a power for operating the moving module 1.

The battery 271 may be supported by the upper plate 220 of the inner module 200. The battery 271 may be disposed between the upper plate 220 and the top plate 230.

The battery 271 may be disposed inside the body 100 while being biased rearward.

Meanwhile, the display units 500 and 600 may be supported by the top plate 230 of the inner module 200. The display units 500 and 600 may be disposed on an upper front side of the top plate 230. The body display unit 400 may not overlap the battery 271 in the vertical direction.

With the above configuration, a load of the battery 271 may be balanced with loads of the body display unit 500 and the head display unit 600. Accordingly, the moving module 1 may be prevented from tilting forward or rearward or from being overturned.

The control box 272 may be disposed on a front side of the battery 271. The control box 272 may be supported by the upper plate 220 of the inner module 200. The control box 272 may be disposed between the upper plate 220 and the top plate 230. At least a part of the control box 272 may vertically overlap the display units 500 and 600.

The control box 272 may include a boxing case having a box shape and a controller provided inside the boxing case. The boxing case may have a plurality of through-holes to dissipate heat inside the control box 272. The controller may include a PCB, and may control an overall operation of the moving module 1.

Since the control box 272 is disposed on the front side of the battery 271, the load of the battery 271 which is biased rearward may be balanced with a load of the control box 272. Accordingly, the moving module 1 may be prevented from tilting forward or rearward or from being overturned.

The body 100 may be provided with at least one radar. The lidar is a sensor capable of detecting a distance to an object and various physical properties by projecting a laser onto a target.

The body 100 may be provided with a front lidar 275A and a rear lidar 275B, and the front lidar 275A and the rear lidar 275B may detect surrounding objects, geographic features, and the like. The front lidar 275A and the rear lidar 275B may be provided at front and rear portions of the body 100, respectively.

At least a part of the front lidar 275A may be disposed under the control box 272. The front lidar 275A and the rear lidar 275B may be disposed at the same height within the body 100. The front lidar 275A and the rear lidar 275B may be disposed at a position lower than the battery 271 within the body 100.

The front lidar 275A and the rear lidar 275B may be supported by the lower plate 210 of the inner module 200. The front lidar 275A and the rear lidar 275B may be disposed between the lower plate 210 and the upper plate 220. In this case, a space inside the body 100 can be efficiently utilized as compared with a case where the front lidar 275A and the rear lidar 275B are disposed at the same height as the battery 271. Therefore, the body 100 can have a compact size.

The controller of the control box 272 may receive information detected by the front lidar 275A and the rear lidar 275B, and may perform 3D mapping based on the information or control the traveling unit 240 so that the moving module 1 may evade an obstacle.

The housing 300 may be formed at a front portion thereof with a front open portion OP1. The front open portion OP1 may be opened toward the front side. The front open portion OP1 may extend in the circumferential direction of the housing 300. The front lidar 275A may detect information on a front region of the moving module 1 through the front open portion OP1 formed in the front portion of the body 100. The front lidar 275A may detect an obstacle or the like located on a front side of the moving module 1 through the front open portion OP1 or may perform mapping on the front region of the moving module 1.

The housing 300 may be formed at a rear portion thereof with a rear open portion OP2. The rear open portion OP2 may be opened toward a rear side. The rear open portion OP2 may extend in the circumferential direction of the housing 300. The rear lidar 275B may detect information on a rear region of the moving module 1 through the rear open portion OP2 formed in the rear portion of the body 100. The rear lidar 275B may detect an obstacle or the like located on a rear side of the moving module 1 through the rear open portion OP2 or may perform the mapping on the rear region of the moving module 1.

In addition, the body 100 may be provided with at least one cliff sensor. The cliff sensor may detect a state of a ground surface and presence of a cliff through transmission and reception of infrared rays. The body 100 may be provided with a front cliff sensor 276A and a back cliff sensor 276B.

The front cliff sensor 276A and the back cliff sensor 276B may detect the state of the ground surface and the presence of the cliff on the front and rear regions of the moving module 1.

The controller of the control box 272 may receive information detected by the front cliff sensor 276A and the back cliff sensor 276B, and may control the traveling unit 240 so that the moving module 1 may evade the cliff.

The front cliff sensor 276A may be disposed above the front lidar 275A. The back cliff sensor 276B may be disposed above the rear lidar 276B.

The front cliff sensor 276A and the back cliff sensor 276B may be suspended from the top plate 230 of the inner module 200 so as to be supported by the top plate 230 of the inner module 200. The front cliff sensor 276A and the back cliff sensor 276B may be disposed between the upper plate 220 and the top plate 230.

At least a part of the front cliff sensor 276A may be disposed above the control box 272. The back cliff sensor 276B may be disposed on a rear side of the battery 271.

In other words, the front cliff sensor 276A may be disposed at a position higher than the back cliff sensor 276B within the body 100.

Accordingly, a space inside the body 100 can be effectively utilized as compared with a case where the front cliff sensor 276A is disposed on a front side of the control box 272. Therefore, the body 100 can be made in a compact size in the front-rear direction.

The housing 300 may be formed at the front portion thereof with an upper open portion OP3. The upper open portion may be formed above the front open portion OP1. The upper open portion OP3 may be opened toward the front side or a lower front side. The front cliff sensor 276A may detect the state of the ground surface on the front side of the moving module 1 through the upper open portion OP3.

The back cliff sensor 276B may detect the state of the ground surface on the rear side of the moving module 1 through the rear open portion OP2.

A wiring shutoff switch 277 may be mounted in the body 100. The wiring shutoff switch 277 may immediately stop the driving of the moving module 1 by shutting off the power of the moving module 1.

The wiring shutoff switch 277 may be disposed on a rear side of the front lidar 275A. The wiring shutoff switch 277 may be supported by the lower plate 210 of the inner module 200.

Meanwhile, a height H1 of upper ends of the display units 500 and 600 may be higher than a height H2 of an upper end of the body 100.

The display units 500 and 600 may have at least one opening through which a cable may pass.

The body display unit 500 may be formed in a rear surface thereof with a rear opening 530A. The rear opening 530A may be formed in a lower rear surface of the body display unit 500.

The body display unit 500 may be formed in a lower portion thereof with a lower opening 500B. The lower opening 500B may be formed by opening a bottom surface of the body display unit 500. The cable connected to the display unit 500 may extend into the body 100 through the lower opening 500B, and may be connected to the control box 272.

The cable connected to the serving module M may extend into the body display unit 500 through the rear opening 530A, may extend into the body 100 through the lower opening 500B, and may be connected to the control box 272.

Figure 5:
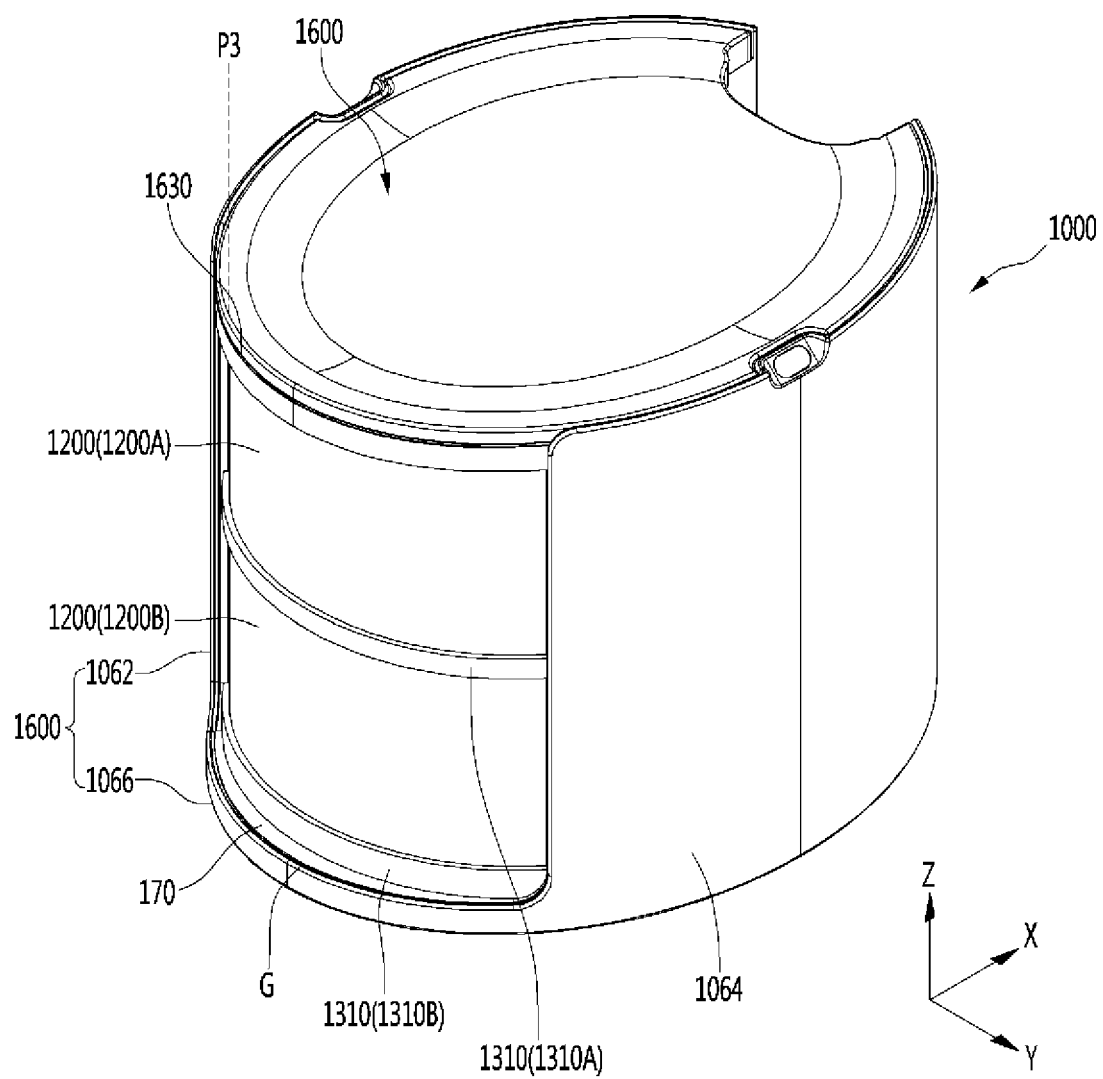
FIG. 5 is a perspective view showing the serving module according to the embodiment.
Figure 6:
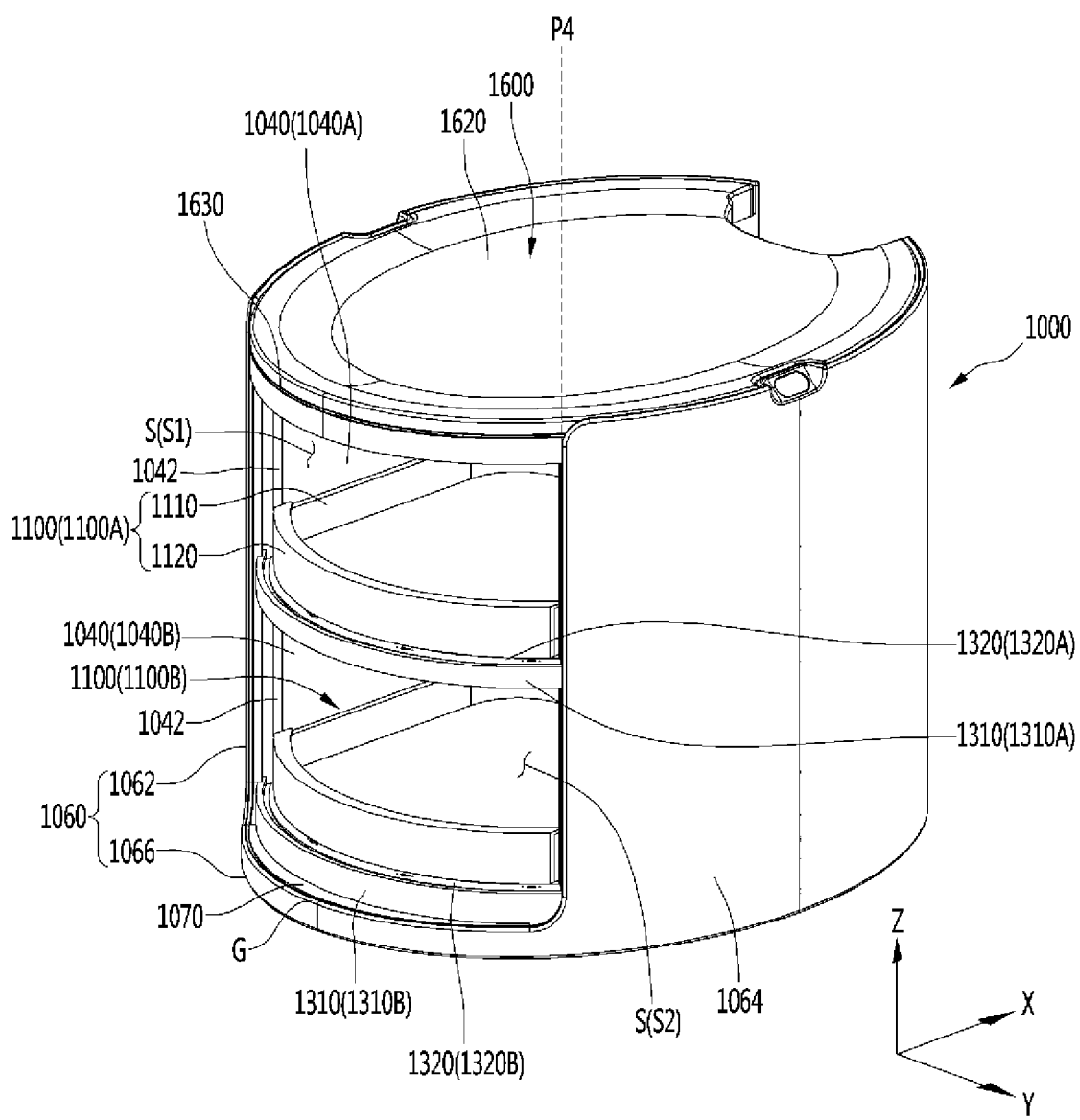
FIG. 6 is a perspective view showing a state in which a door shown in FIG. 5 is opened.
Figure 7:
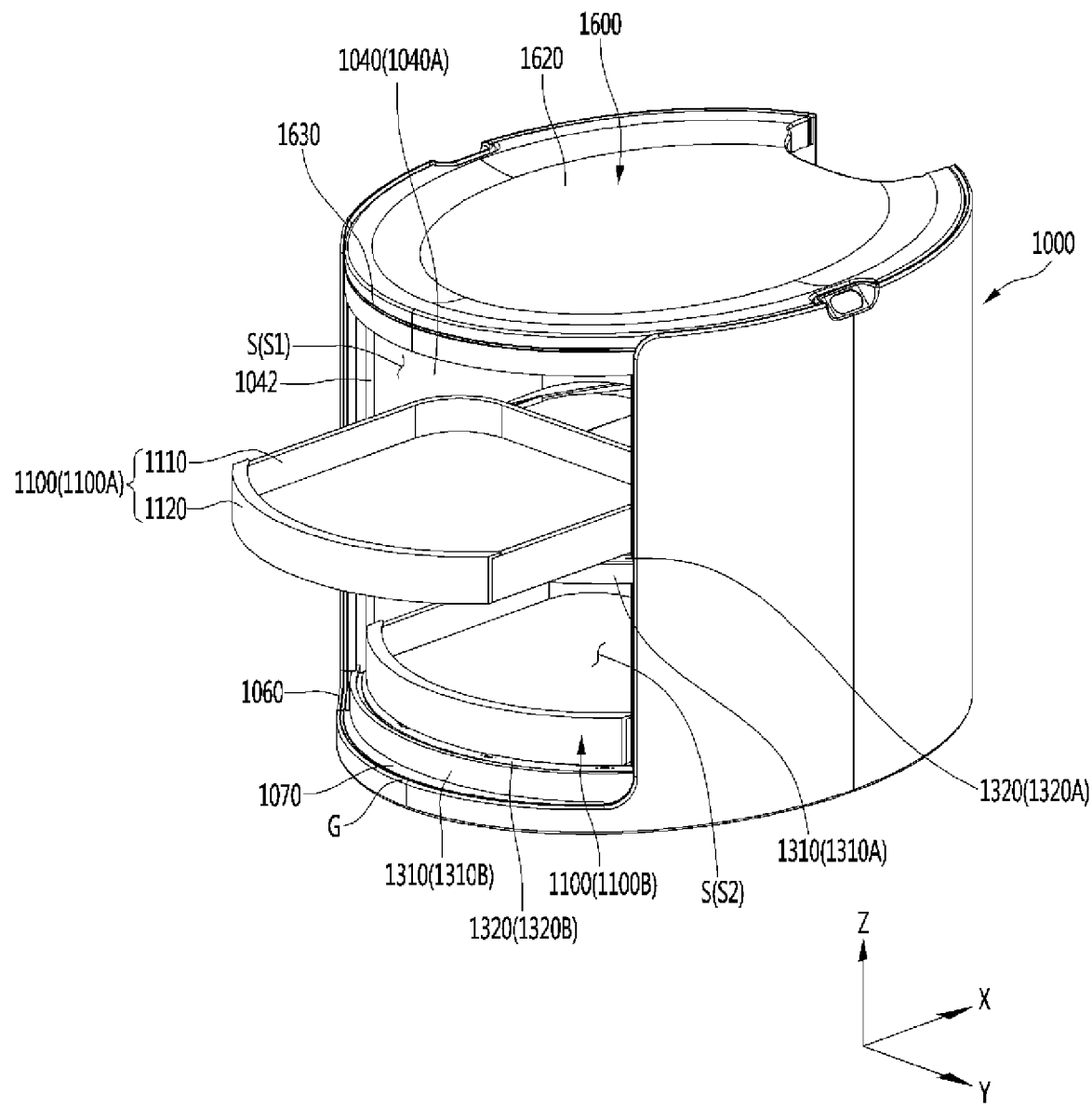
FIG. 7 is a perspective view showing a state in which a tray shown in FIG. 6 is moved out of a tray space.
Figure 8:
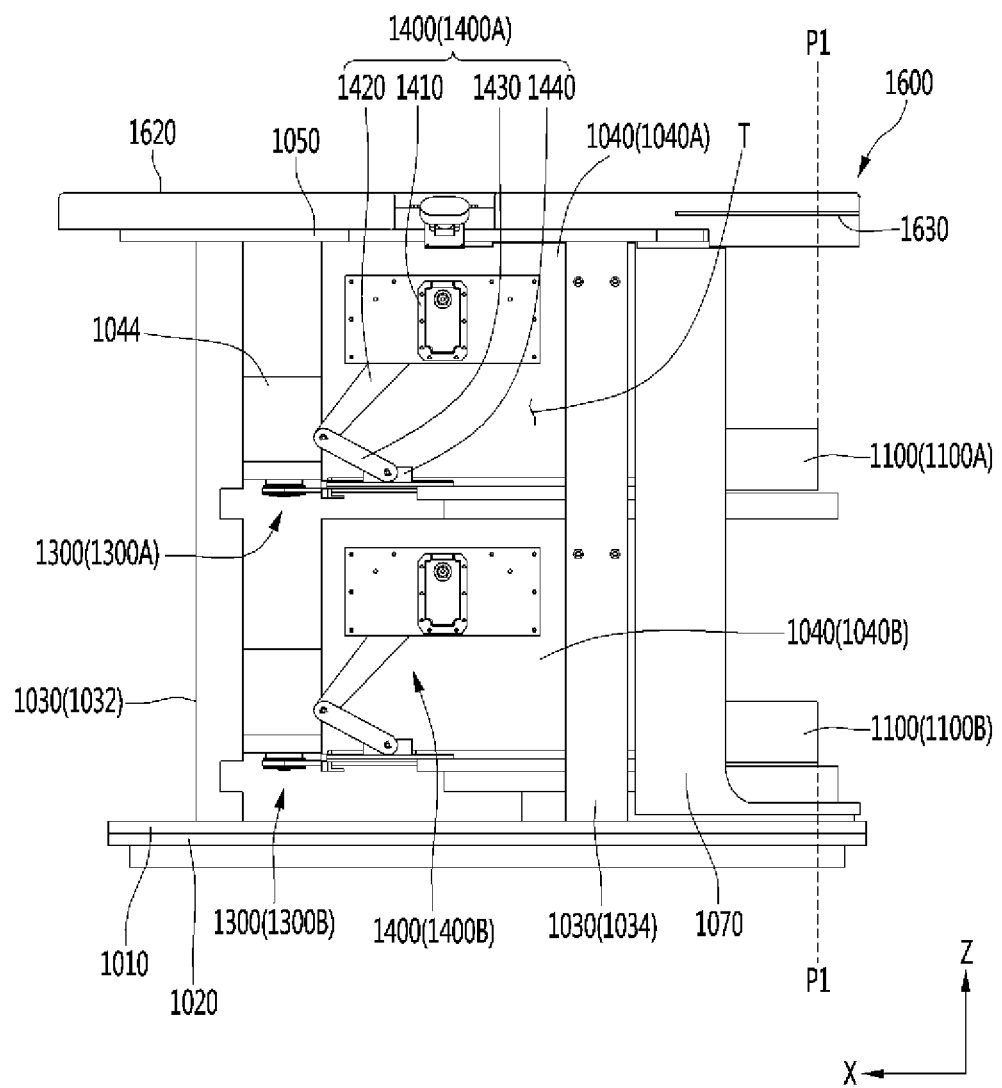
FIG. 8 is a side view showing a state in which an outer cover shown in FIG. 6 is removed.
Figure 9:
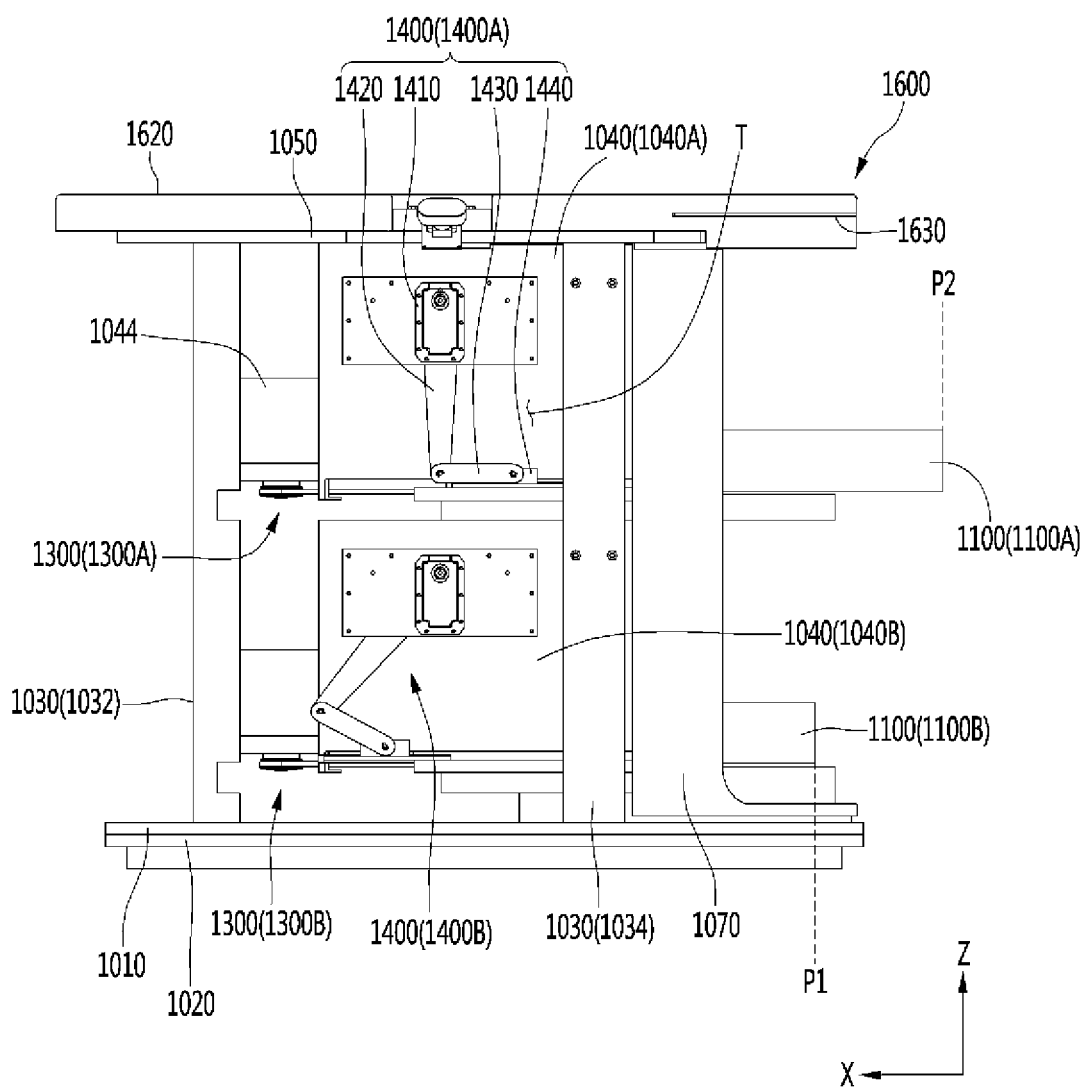
FIG. 9 is a side view showing a state in which the outer cover shown in FIG. 7 is removed.
Figure 10:
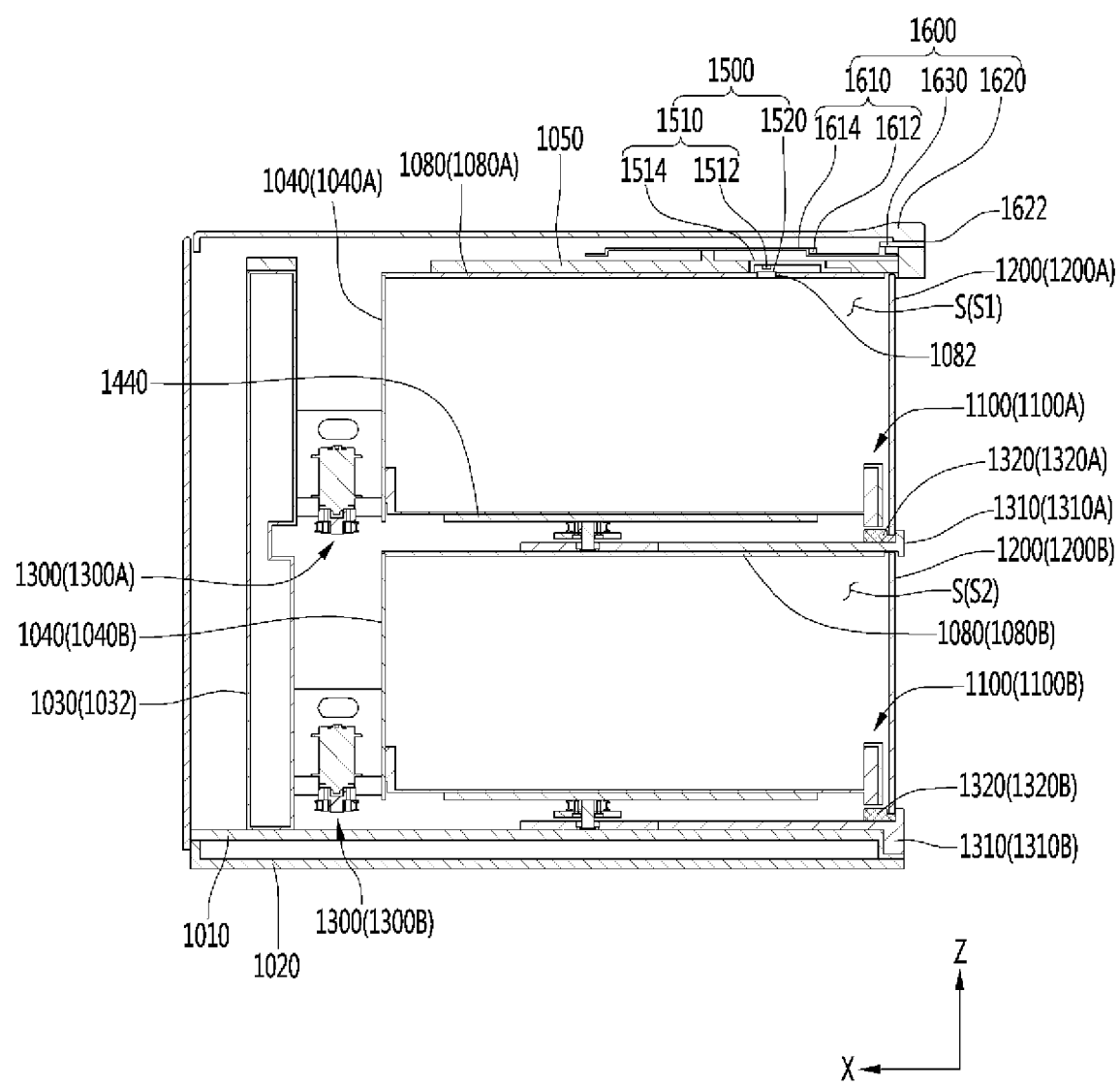
FIG. 10 is a sectional view of the serving module according to the embodiment.

FIG. 5 is a perspective view showing the serving module according to the embodiment, FIG. 6 is a perspective view showing a state in which a door shown in FIG. 5 is opened, FIG. 7 is a perspective view showing a state in which a tray shown in FIG. 6 is moved out of a tray space, FIG. 8 is a side view showing a state in which an outer cover shown in FIG. 6 is removed, FIG. 9 is a side view showing a state in which the outer cover shown in FIG. 7 is removed, and FIG. 10 is a sectional view of the serving module according to the embodiment.

The serving module M may include a main body 1000, a tray 1100, and a door 1200.

The main body 1000 may constitute an exterior of the serving module M. The main body 1000 may be formed therein with a tray space S configured to accommodate the tray 1100. The main body 1000 may have a tray entrance G. The tray entrance G may face the tray space S.

The tray 1100 may be accommodated in the tray space S, and at least a part of the tray 1100 may be moved so as to be disposed outside the tray entrance G in order to serve an article placed on the tray 1100 to the customer.

The main body 1000 may include a base 1010 (see FIGS. 8 and 9).

The main body 1000 may further include a moving module connector 1020 detachably coupled to the moving module 1. The moving module connector 1020 may be disposed at a lowermost portion of the main body 1000, and may constitute an exterior of the bottom surface of the main body 1000. The moving module connector 1020 may be disposed under the base 1010. The moving module connector 1020 may have a guide hole through which the module guide 231 (see FIG. 3) installed in the moving module 1 passes so that the module guide 231 is guided. The moving module connector 1020 may have a fastening hole to which the module fastening portion 232 installed in the moving module 1 is fastened.

The main body 1000 may include a supporter 1030, an inner case 1040, and an upper plate 1050.

The supporter 1030 may be installed on the base 1010, and may support the inner case 1040 and the upper plate 1050.

The supporter 1030 may be disposed on a top surface of the base 1010, and may extend in a vertical direction Z.

The supporter 1030 may include a plurality of unit supporters 1032, 1034, and 1036, and the unit supporters 1032, 1034, and 1036 may be spaced apart from each other in the horizontal direction. A lower end of each of the unit supporters 1032, 1034, and 1036 may be placed on the base 1010.

The unit supporters 1032, 1034, and 1036 may include a front supporter 1032 and a side supporter.

A plurality of side supporters may be provided in the serving module M, and the side supporters 1034 and 1036 may include a left supporter 1034 and a right supporter 1036 spaced apart from the left supporter 1034 in a left-right direction Y.

The base 1010, the supporter 1030, and the upper plate 1050 may function as a frame capable of supporting the inner case 1040 and the tray 1100.

The inner case 1040 may be coupled with the supporter 1030, and may be supported by the supporter 1030. The inner case 1040 may be formed therein with the tray space S. The tray space S may be larger than the tray 1100, and may be defined as a space in which the tray 1100 is accommodated.

The inner case 1040 may have an opening 1042 (see FIGS. 6 and 7). The opening 1042 may be opened in the horizontal direction. The opening 1042 may have a size that allows the tray 1100 to pass therethrough.

The inner case 1040 may be configured such that a surface of the inner case 1040 opposed to the opening 1042 and left and right surfaces of the inner case 1040 are closed. The opening 1042 may be formed in a rear surface of the inner case 1040, and the inner case 104 may be configured such that a front surface, a left surface, and a right surface of the inner case 104 are closed.

The inner case 1040 may be provided with a front bracket 1044 (see FIGS. 8 and 9) coupled to the supporter 1030. The front bracket 1044 may be formed on an opposite side of the opening 1042 of the inner case 1040. The front bracket 1044 may protrude in a direction opposite to the opening 1042. The opening 1042 may be opened in the inner case 1040 in a rearward direction. The front bracket 1044 may protrude forward from the inner case 1040.

The front bracket 1044 may be coupled to the front supporter 1032. The front bracket 10434 may be fastened to the front supporter 1032 by a fastening member such as a screw.

The left supporter 1034 and the right supporter 1036 may be spaced apart from each other in the left-right direction Y with the inner case 1040 interposed therebetween, and each of the left supporter 1034 and the right supporter 1036 may be fastened to the inner case 1040 by the fastening member such as a screw.

The main body 1000 may further include a separate outer cover 1060 (see FIGS. 5 to 7), and when the tray entrance G is formed in the outer cover 1060, at least a part of the opening 1042 may face the tray entrance G. In this case, the opening 1042 may be an inner entrance disposed inward of the tray entrance G, and the tray entrance G may be an outer entrance disposed outward of the opening 1042.

In addition, the main body 1000 may not include the separate outer cover 1060. In this case, the opening 1042 of the inner case 1040 may be a tray entrance through which the tray 1100 may enter.

The upper plate 1050 (see FIGS. 8 to 10) may be coupled to an upper portion of the supporter 1030. The upper plate 1050 may be supported by the supporter 1030. The upper plate 1050 may be disposed above the base 1010 while being spaced apart from the base 1010 in the vertical direction Z. The inner case 1030 may be disposed between the base 1010 and the upper plate 1050.

When the supporter 1030 includes a plurality of unit supporters 1032 and 1034, the upper plate 1050 may be placed on an upper end of each of the unit supporters 1032 and 1034.

The upper plate 1050 may be placed on an upper end of each of the front supporter 1032, the left supporter 1034, and the right supporter 1036. The upper plate 1050 may be fastened to each of the front supporter 1032, the left supporter 1034, and the right supporter 1036 by the fastening member such as a screw.

The main body 1000 may further include an outer cover 1060. The outer cover 1060 may cover the supporter 1030 and the inner case 1040 so that the supporter 1030 and the inner case 1040 may not be viewed on lateral sides of the serving module M. The outer cover 1060 may cover a door driving device 1300, which will be described below, and may cover the door driving device 1300 so that the door driving device 1300 may not be viewed from the lateral side. The outer cover 1060 may cover a tray moving device 1400, which will be described below, and may cover the tray moving device 1400 so that the tray moving device 1400 may not be viewed from the lateral side.

The outer cover 1060 may constitute a side exterior of the serving module M, and may constitute an outer surface of the serving module M. The outer cover 1060 may include a left cover 1062 that configures a left side exterior of the serving module M, and a right cover 1064 that configures a right side exterior of the serving module M. The tray entrance G may be opened between the left cover 1062 and the right cover 1064 in the horizontal direction (especially in the rearward direction).

The outer cover 1060 may further include a connecting body 1066 configured to connect the left cover 1062 to the right cover 1064. In addition, the connecting body 1066 may be an upper body configured to connect an upper portion of the left cover 1062 to an upper portion of the right cover 1064, or may be a lower body configured to connect a lower portion of the left cover 1062 to a lower portion of the right cover 1064.

The main body 100 may further include a decoration body 1070 disposed between the inner case 1040 and the outer cover 1060.

The decoration body 1070 may be disposed in a gap between the inner case 1040 and the outer cover 1060. A size of the decoration body 1070 may be smaller than a size of the outer cover 1060. The decoration body 1070 may include a left decoration 1072 (see FIG. 12) facing the left cover 1062 and a right decoration 1074 (see FIG. 12) facing the right cover 1064. The decoration body 1070 may further include a connecting decoration 1076 (see FIG. 12) configured to connect the left decoration 1071 to the right decoration 1074 and facing the connecting body 166.

The serving module M may further include an inner cover 1080 (see FIG. 10) disposed on an upper portion of the inner case 1040. The inner case 1040 may have an open top, and the inner cover 1080 may cover a top surface of the inner case 1040 from the upper portion of the inner case 1040.

A plurality of trays 1100 may be provided inside the main body 1000. The serving module M may collectively accommodate a plurality of articles to be served to a plurality of customers, and may sequentially serve the articles to the customers.

A plurality of trays 1100A and 1100B may include an upper tray 1100A and a lower tray 1100B.

The upper tray 1100A and the lower tray 1100B may be accommodated in the main body 1000 while being spaced apart from each other in the vertical direction Z.

The upper tray 1100A and the lower tray 1100 may be accommodated separately from each other in the serving module M.

One example of the serving module M may include one inner case 1040, and a partition member configured to divide the tray space S into an upper space and a lower space may be disposed inside the inner case 1040.

Another example of the serving module M may be provided with the inner case for each of the upper tray 1100A and the lower tray 1100. In this case, the serving module M may include an upper inner case 1040A having an upper tray space S1, and a lower inner case 1040B having a lower tray space S2.

In addition, the serving module M may be provided with the inner cover for each of the upper tray 1100A and the lower tray 1100. In this case, the serving module M may include an upper inner cover 1080A disposed on an upper portion of the upper inner case 1040A to cover a top surface of the upper inner case 1040A, and a lower inner cover 1080B disposed on an upper surface of the lower inner case 1040B to cover a top surface of the lower inner case 1040B.

The tray 1100 may be configured as an assembly of a plurality of members. The tray 1100 may include a tray body 1110 having a shape of a container with an open top, and a tray decoration 1120 configured to cover a surface that may be exposed through the tray entrance G when the tray body 1110 is accommodated in the tray space S.

The door 1200 may be disposed to open and close the tray entrance G. The door 1200 may be rotatably disposed on the main body 100, and may open and close the tray entrance G by rotating about a rotation center axis.

The door 1200 may be provided for each tray accommodated in the serving module M. When the upper tray 1100A and the lower tray 1100B are accommodated in the serving module M, a plurality of doors 1200 may be provided in the serving module M. A plurality of doors 1200A and 1200B may include an upper door 1200A configured to open and close the upper tray space S1 in which the upper tray 1100A is accommodated, and a lower door 1200B configured to open and close the lower tray space S2 in which the lower tray 1100B is accommodated.

The serving module M may further include the door driving device 1300 that may open and close the door 1200.

The door driving device 1300 may be connected to the door 1200. As shown in FIG. 5, the door driving device 1300 may move the door 1200 to a close position P3 at which the tray entrance G is blocked. As shown in FIG. 6, the door driving device 1300 may move the door 1200 to an open position P4 at which the tray entrance G is fully opened. The detailed configuration of the door driving device 1300 will be described below.

When the doors 1200A and 1200B are provided in the serving module M, the door driving device 1300 is preferably provided for each of the doors 1200A and 1200B. In this case, the doors 1200A and 1200B may be opened and closed independently. A plurality of door driving devices 1300A and 1300B may include a first driving device 1300A connected to one of the doors 1200A and 1200B, and a second driving device 1300B connected to the remaining one of the doors 1200A and 1200B.

The configuration of the first driving device 1300A may be the same as the configuration of the second driving device 1300B. Hereinafter, common configurations of the first driving device 1300A and the second driving device 1300B will be described as the door driving device 1300, and the difference in configurations of the first driving device 1300A and the second driving device 1300B will be described separately for each of the first driving device 1300A and the second driving device 1300B.

When one of the doors 1200A and 1200B that is positioned relatively higher than the remaining one is the upper door 1200A, and the remaining one of the doors 1200A and 1200B that is positioned lower than the upper door 1200A is the lower door 1200B, the first driving device 1300A may be an upper driving device connected to the upper door 1200A to open and close the upper door 1200A, and the second driving device 1300B may be a lower driving device connected to the lower door 1200B to open and close the lower door 1200B.

The door driving device 1300 may include a rotor supporter 1310. The door 1200 may be connected to the rotor 1320, and the rotor 1320 may be rotatably supported by the rotor supporter 1310. The door 1200 may be rotated together with the rotor 1320 about the rotation center axis of the rotor 1320 supported by the rotor supporter 1310.

When the serving module M includes the upper door 1200A and the lower door 1200B, the first driving device 1300A may include an upper rotor 1320A connected to the upper door 1200A to rotate the upper door 1200A, and the second driving device 1300B may include a lower rotor 1320B connected to the lower door 1200B to rotate the lower door 1200.

When the serving module M includes the upper rotor 1320A and the lower rotor 1320B, a plurality of rotor supporters 1310 may be provided in the serving module M. The first driving device 1300A may include an upper supporter 1310A configured to guide the upper rotor 1320A connected to the upper door 1200A, and the second driving device 1300B may include a lower supporter 1310B configured to guide the lower rotor 1320B connected to the lower door 1200B.

The serving module M may further include the tray moving device 1400 capable of moving the tray 1100.

The tray moving device 1400 may be disposed on the main body 1000.

The tray moving device 1400 may move at least a part of the tray 1100 out of the tray entrance G as shown in FIG. 7, and may move an entire of the tray 1100 into the tray space S as shown in FIG. 6.

The tray moving device 1400 may move the tray 1100 from a first position 81 (see FIG. 8) to a second position P2 (see FIG. 9), or may move the tray 1100 from the second position P2 to the first position P1.

The first position P1 may be a position where the entire of the tray 1100 is accommodated in the accommodation space S1. The first position P1 may be a protection position P1 where an article placed on the tray 11000 is protected by the serving module M.

The second position P2 may be a position of the tray 1100 when at least a part of the tray 1100 is moved out of the tray space S. The second position P2 may be a position where at least a part of the tray 1100 passes through the tray entrance G, and may be a serving position P2 where the article placed on the tray 1100 is served to the customer.

The tray moving device 1400 may be a tray forward-rearward moving device configured to move the tray 1100 back and forth in a direction toward the tray entrance G.

The tray moving device 1400 may include a tray motor 1410 mounted on the main body 1000, a driving link 1420 connected to the tray motor 1410, and a driven link 1430 connected to the driving link 1420.

The tray motor 1410 may be mounted on the inner case 1040. The tray motor 1410 may be mounted on the inner case 1040 such that the tray motor 1410 is disposed outside the tray space S1.

The tray motor 1410 may be disposed in a gap T formed between the inner case 1040 and the outer cover 1060.

In addition, the driving link 1420 and the driven link 1430 may be disposed in the gap T formed between the inner case 1040 and the outer cover 1060.

The driving link 1420 may be connected to a rotation shaft of the tray motor 1410.

The driving link 1420 and the driven link 1430 may be connected to each other such that the driving link 1420 and the driven link 1430 can be folded and unfolded. The driven link 1430 may be rotatably connected to the driving link 1420.

The tray moving device 1400 may further include a tray carrier 1440 on which the tray 1100 is placed. The tray carrier 1440 may be connected with the driven link 1430, and the driven link 1430 may move the tray carrier 1440. In this case, it is unnecessary to directly connect the tray 1100 to the driven link 1430, and the tray 1100 may be cleaned or replaced after being separated from the tray carrier 1440.

When the trays 1100A and 1000B are provided inside the main body 1000, the tray moving device 1400 may be provided for each of the trays 1100A and 1000B. In this case, the trays 1100A and 1000B may be moved linearly and independently.

A plurality of tray moving devices 1400A and 1400B may include a first moving device 1400A connected to one of the trays 1100A and 1100B, and a second moving device 1400B connected to the remaining one of the trays 1100A and 1100B.

For example, one of the trays 1100A and 1100B that is positioned relatively higher than the remaining one may be the upper tray 1100A, and the remaining one of the trays 1100A and 1100B that is positioned lower than the upper tray 1100A may be the upper tray 1100B. In this case, the first moving device 1400A may be an upper moving device connected to the upper tray 1100A to linearly move the upper tray 1100A. The second moving device 1400B may be a lower moving device connected to the lower tray 1100B to linearly move the lower tray 1100B.

Hereinafter, common configurations of the first moving device 1400A and the second moving device 1400B will be described as the tray moving device 1400, and the difference in configurations of the first moving device 1400A and the second moving device 1400B will be described separately for each of the first moving device 1400A and the second moving device 1400B.

The serving module M may further include an inner lighting device 1500 (see FIG. 10) configured to emit light into the tray space S from an upper side of the tray space S.

The serving module M may include: an inner light emitting device 1510 installed on the inner cover 1080; and an inner window 1520 configured to face the inner light emitting device 1510 and disposed in the inner cover 1080.

The inner cover 1080 may have an inner window accommodation hole 1082 in which the inner window 1530 is accommodated. The inner window accommodation hole 1082 may be formed in the inner cover 1080 and opened in the vertical direction Z. The inner window accommodation hole 1082 may have an arc shape.

The inner window 1520 may be disposed in the inner window accommodation hole 1082, and may have a bottom surface facing the tray accommodation space S and a top surface facing the inner light emitting device 1510.

The inner light emitting device 1510 may emit the light toward the inner window 1520, and the light emitted from the inner light emitting device 1510 may be proceed into the tray space S by passing through the inner window 1520 so as to lighten the tray space S.

The inner light emitting device 1510 may be disposed above the inner cover 11080 and may include a light source 1512 such as an LED and an inner PCB 1514 provided with the light source 1512. The inner PCB 1514 may be provided with a plurality of light sources 1512, and the light sources 1512 may be spaced apart from each other in a longitudinal direction of the inner window 1520.

The inner light emitting device 1510 and the inner window 1520 may constitute an inner lighting device 1500 configured to emit the light into the tray space S.

The inner lighting device 1500 may be turned on and off by a controller 273 which will be described below. The inner lighting device 1500 may be turned on to emit the light into the tray space S when the door 1200 is opened. The inner lighting device 1500 may be turned off when the door 1200 is closed.

The inner lighting device 1500 may be turned on from an open start time of the door 1200, turned on while the door 1200 is moved to rotate to a maximum open position, and turned on after the door 1200 has been rotated to the maximum open position. The inner lighting device 1500 may be continuously turned on while the door 1200 is maintained in an open state.

The inner lighting device 1500 may be turned off when the door 1200 has been rotated to a close position.

The serving module M may further include an indicator 1600 disposed on the main body 1000. The indicator 1600 may be disposed on an upper portion of the main body 1000. The indicator 1600 may form a lighting pattern. The lighting pattern formed by the indicator 1600 may vary in size or position. The indicator 1600 may change the lighting pattern during an operation of the door 1200.

The serving module M may include an outer light emitting device 1610 disposed on the upper plate 1050, a top cover 1620 configured to cover the upper plate 1050 and the outer light emitting device 1610 and formed at one side thereof with a light transmitting portion 1622, and an outer window 1630 disposed in the light transmitting portion 1622 and configured to transmit light emitted from the upper light emitting device.

The outer light emitting device 1610 may be disposed above the top plate 1050. The outer light emitting device 1610 may be disposed between the top plate 1050 and the top cover 1620.

The outer light emitting device 1610 may be disposed under the top cover 1620, and may include a light source 1612 such as an LED and an outer PCB 1614 provided with the light source 1612. The outer PCB 1614 may be provided with a plurality of light sources 1612. The light sources 1612 may be spaced apart from each other in the horizontal direction. The light sources 1612 may be spaced apart from each other in a longitudinal direction of the outer window 1620.

The top cover 1620 may constitute an upper exterior of the serving module M. The top cover 1620 may have the light transmitting portion 1622 on an upper side of the door 1100. The light transmitting portion 1622 may be an opening that is formed in the top cover 1620 and opened in the horizontal direction. The light transmitting portion 1622 may have an arc shape.

The outer window 1630 may be accommodated in the light transmitting portion 1622.

Figure 11:
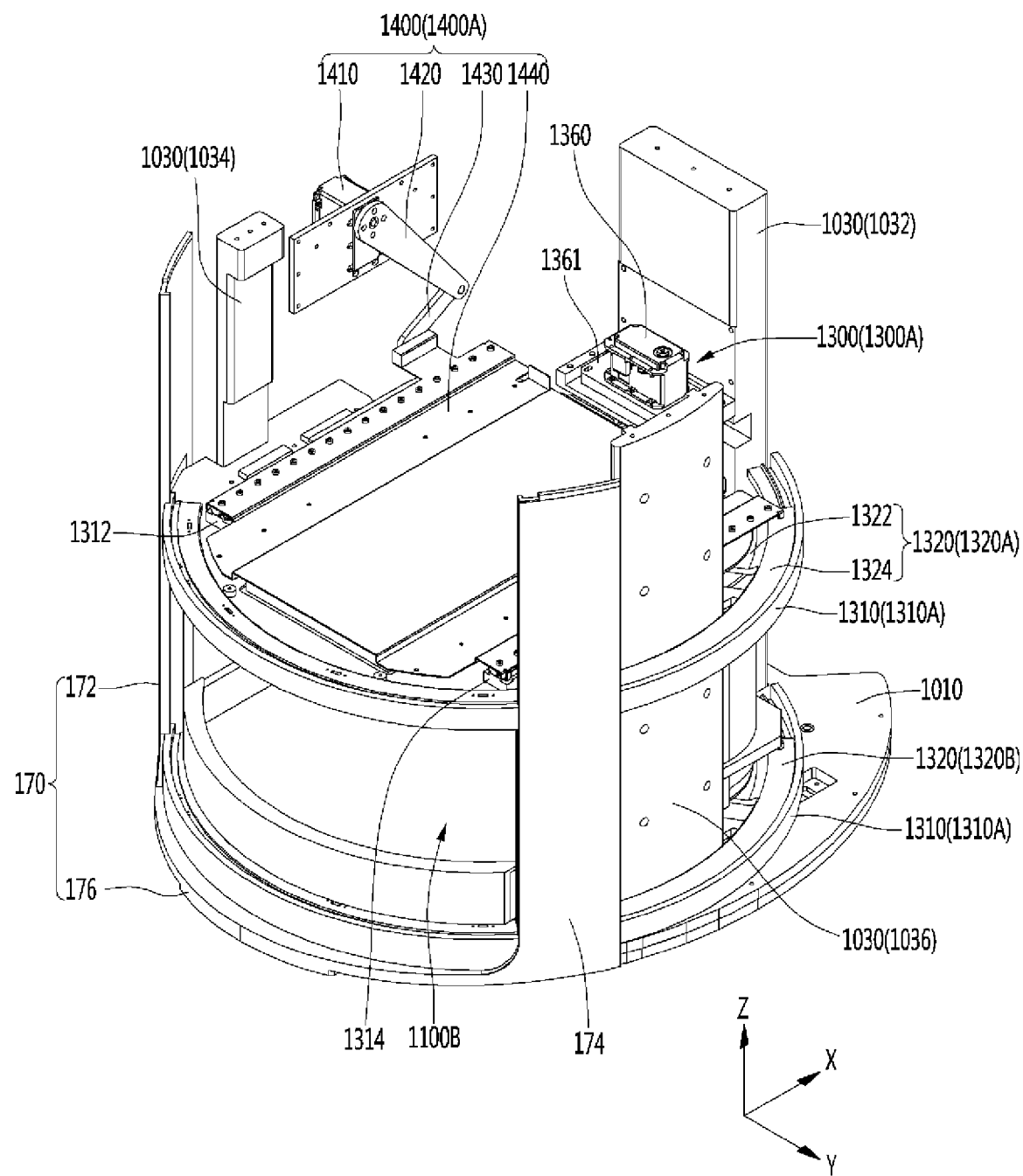
FIG. 11 is a perspective view showing a tray moving device and a door driving device according to the embodiment.
Figure 12:
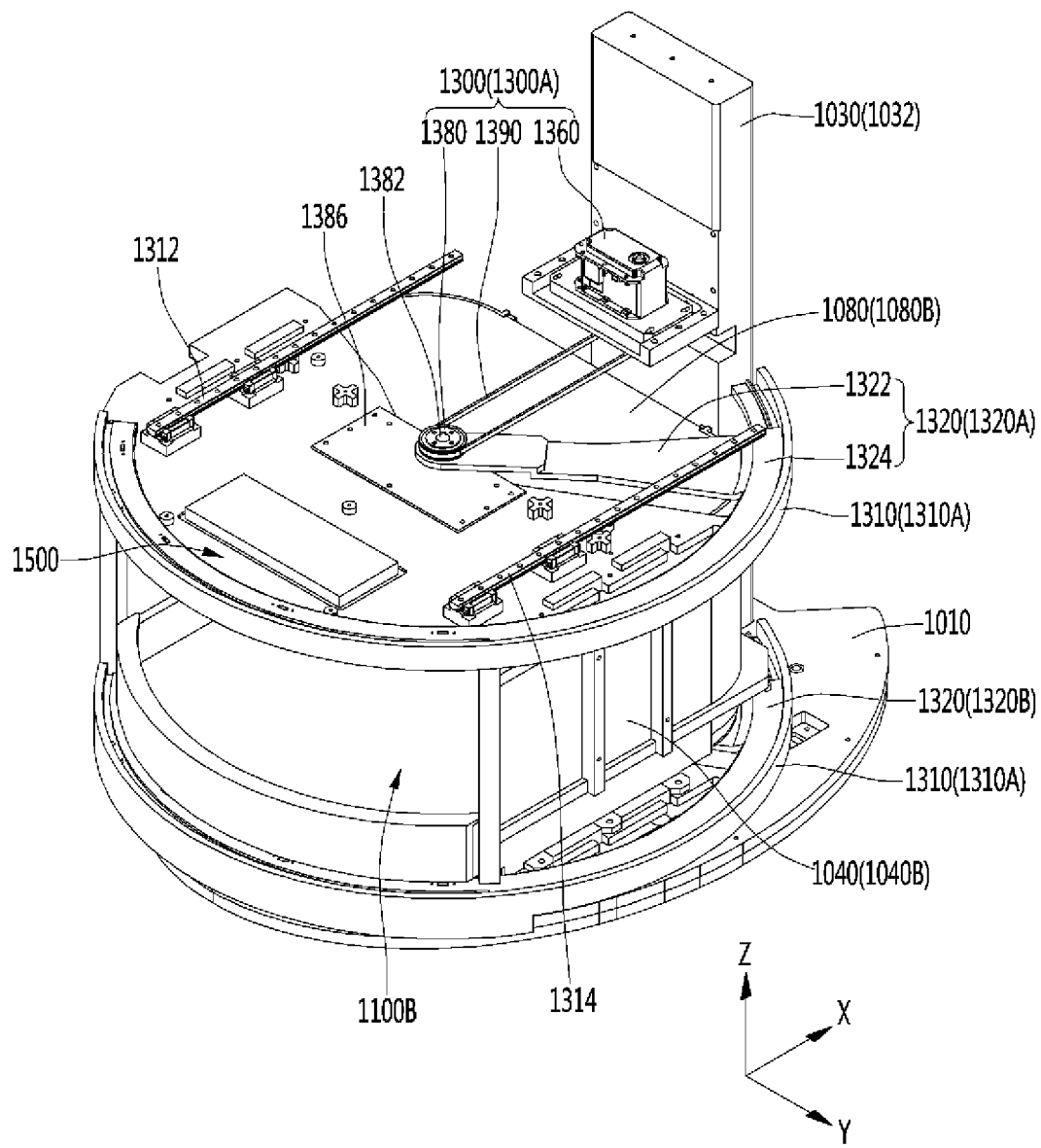
FIG. 12 is a perspective view showing a state in which the tray moving device, a decoration body, and a side frame shown in FIG. 11 are removed.
Figure 13:
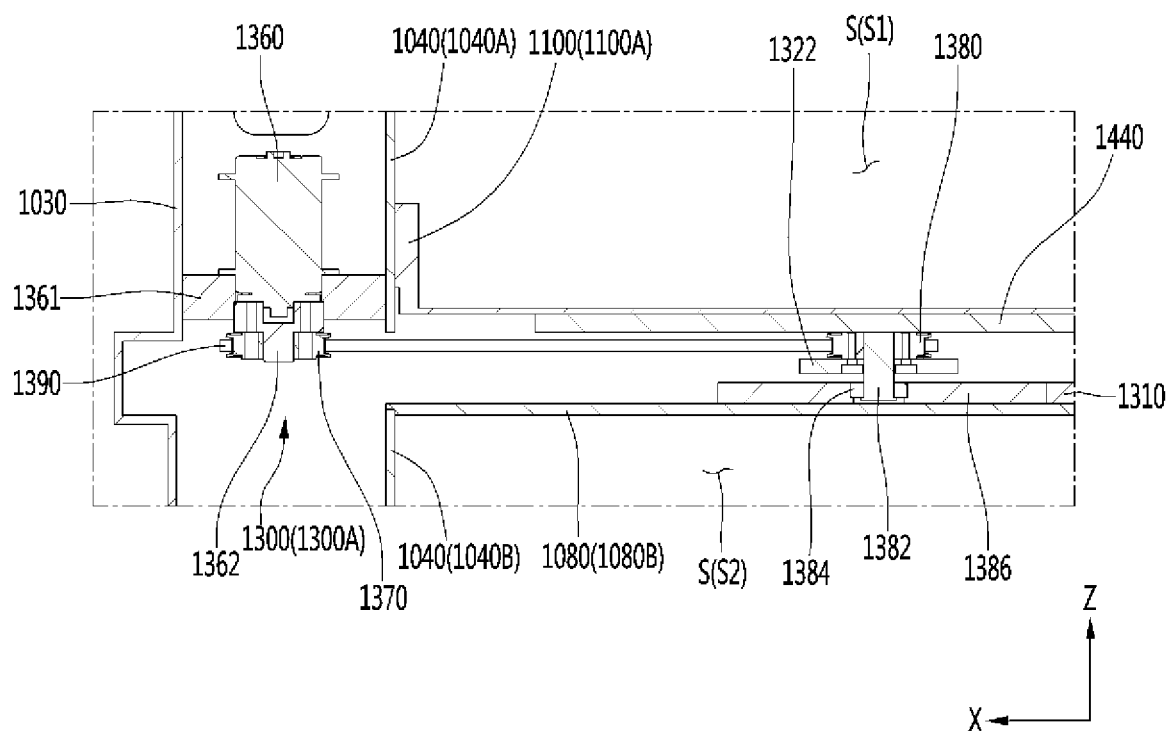
FIG. 13 is an enlarged sectional view of the door driving device according to the embodiment.

FIG. 11 is a perspective view showing a tray moving device and a door driving device according to the embodiment, FIG. 12 is a perspective view showing a state in which the tray moving device, a decoration body, and a side frame shown in FIG. 11 are removed, and FIG. 13 is an enlarged sectional view of the door driving device according to the embodiment.

The door driving device 1300 may include a door motor 1360 configured to generate a driving force for rotating the rotor 1320, and at least one power transmission member configured to transmit the driving force of the door motor 1360 to the rotor 1320. The door driving device 1300 may include a plurality of power transmission members 1370, 1380, and 1390.

The power transmission members 1370, 1380, and 1390 may include: a driving pulley 1370 (see FIG. 13) connected to the door motor 1360; a driven pulley 1380 spaced apart from the driving pulley 1380; a belt 1390 wound around the driving pulley 1370 and the driven pulley 1380.

The door motor 1360 may be installed on a motor installation plate 1361 connected to the front frame 1032.

The driving pulley 1370 may be disposed above or under the door motor 1360. The driving pulley 1370 may be connected to a rotation shaft 1362 of the door motor 1360.

The driven pulley 1380 may be disposed under the tray carrier 1440. The driven pulley 1380 may be connected with a rotation shaft 1382, the rotation shaft 1382 may be connected with a bearing 1384, and the rotor supporter 1310 may be coupled with a bearing supporter 1386 configured to support the bearing 1284.

In other words, the driven pulley 1380 may be supported by the rotor supporter 1310 through the rotation shaft 1382, the bearing 1344, and the bearing supporter 1386, and may be rotated about the rotation shaft 1382.

The rotor 1320 may be fastened with the driven pulley 1380 by the fastening member such as a screw and may rotate about the driven pulley 1380, and the rotation shaft 1382 connected to driven pulley 1380 may be the rotation center axis of the rotor 1320.

The rotor 1320 may have a driven pulley connection body 1322 connected to the driven pulley 1380, and a door connection body 1324 connected to the door 1300.

The driven pulley connection body 1322 may have a bar shape extending from the rotation shaft 1382 toward the door connection body 1324.

The driven pulley connection body 1322 may have a rotation shaft through-hole through which the rotation shaft 1382 passes. The driven pulley connection body 1322 may have a fastening hole to which the fastening member is fastened so as to be connected to the driven pulley 1380 by the fastening member such as a screw.

The door connection body 1324 may have an arc shape, and the driven pulley connection body 1322 may be connected to one side of the door connection body 1324.

As described above, when the door driving device 1300 includes the driving pulley 1370, the driven pulley 1380, and the belt 1390, the door motor 1360 does not have to be disposed above or under the tray 1100, and the door motor 1360 may be disposed outside the inner case 1040.

If the door motor 1360 is disposed under the tray 1100, in the serving module M, the space utility for a space disposed under the tray 1100 may be lowered.

Meanwhile, when the door driving device 1300 includes the driving pulley 1370, the driven pulley 1380, and the belt 1390, the door motor 1360 may be disposed on a front side or a lateral side of the inner case 1040, the space utility for the space disposed under the tray 1100 may be improved, and the serving module M may be manufactured in a compact size.

The rotor supporter 1310 may be provided with at least one sliding guide configured to guide a linear movement of the tray carrier 1440. A pair of sliding guides may be provided on the rotor supporter 1310. The pair of sliding guides 1312 and 1314 may be spaced apart from each other in the left-right direction Y on a top surface of the rotor supporter 1310, and may extend in a front-rear direction X.

The tray carrier 1440 may be slidably guided in a longitudinal direction of the sliding guides 1312 and 1314 while being placed on the pair of sliding guides 1312 and 1314.

In other words, the rotor supporter 1310 may guide the rotation of the rotor 1320 and the door 1200 as well as the linear movement of the tray carrier 1440 and the tray 1100.

Figure 14:
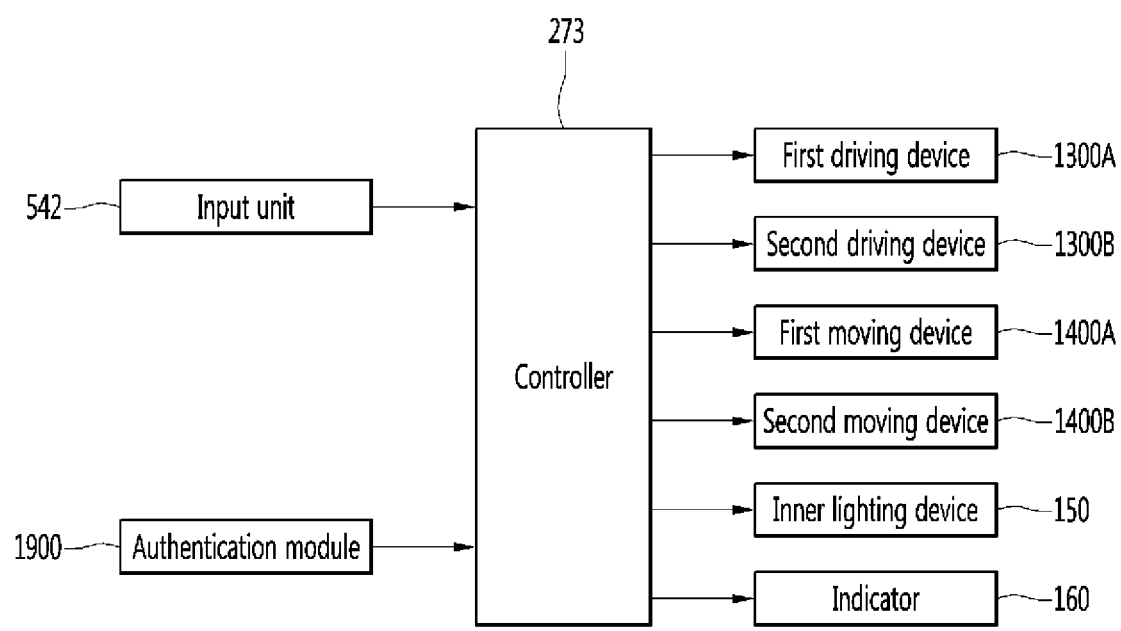
FIG. 14 is a control block diagram of the robot having the serving module according to the embodiment.
Figure 15:
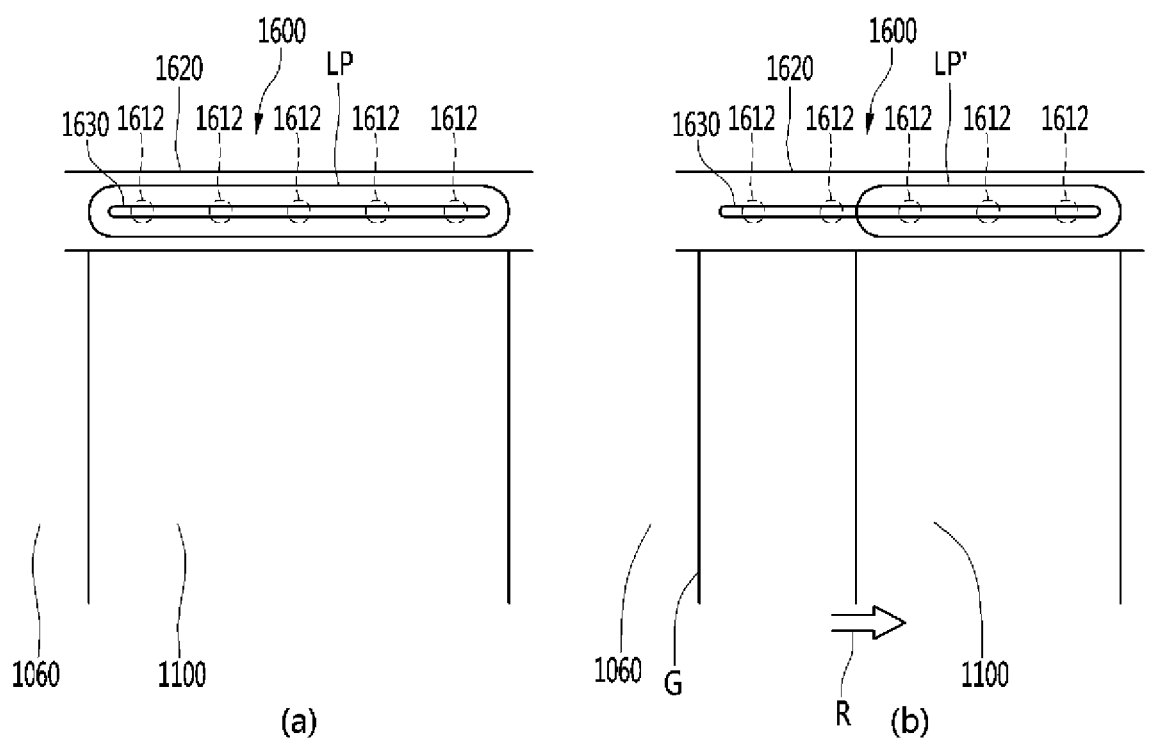
FIG. 15 is a view showing one example of a lighting pattern formed in the serving module according to the embodiment.

FIG. 14 is a control block diagram of the robot having the serving module according to the embodiment, FIG. 15 is a view showing one example of a lighting pattern formed in the serving module according to the embodiment, and Fig. is a view showing one example of the lighting pattern formed in the serving module according to the embodiment.

The robot may include an input unit 542 configured to receive a command of a customer or a manager. The input unit 542 may be configured as a touch screen installed in the moving module 1. The input unit 542 may be installed in the body display 540 or the head display 640 of the moving module 1.

The robot may include the controller 273 configured to control the serving module M. The controller 273 may be installed in the serving module M or installed in the moving module 1. The controller 273 may control the door driving device 1300 and the tray moving device 1400.

The controller 273 may control the door driving device 1300 in a close mode or an open mode.

The close mode is a mode in which the door driving device 1300 rotates the door 1200 to the close position P3 where the tray entrance G is fully blocked by the door 1200 as shown in FIG. 5.

The open mode may be a mode in which the door driving device 1300 rotates the door 1200 to the open position P4 where the tray entrance G is fully opened as shown in FIG. 6.

The controller 273 may control the tray moving device 1400 in a protection mode or a serving mode.

The protection mode may be a mode in which the tray moving device 1400 moves the entire of the tray 1100 into the tray space S as shown in FIG. 8.

The serving mode may be a mode in which the tray moving device 1400 moves the tray 1100 to the serving position P2 as shown in FIG. 9.

When the serving module M includes the upper door 1200A and the lower door 1200B, the controller 273 may control the first driving device 1300A and the second driving device 1300B.

When the serving module M includes the upper tray 1100A and the lower tray 1100B, the controller 273 may control the first moving device 1400A and the second moving device 1400B.

Meanwhile, at least one of the moving module 1 or the serving module M may include an authentication module 1900 configured to authenticate a customer who ordered an article of the tray 11000. The authentication module 1900 may be a device configured to authenticate the customer who ordered an article of at least one of the trays 1100A or 1100B. One example of the authentication module 1900 may be a card reader capable of authenticating an electronic key or a credit card carried by the customer, and types of the authentication module 1900 are not limited as long as the device may authenticate the customer.

Meanwhile, the customer or the manager may input a plurality of commands through the input unit 542.

For example, the customer may input an article to be served (e.g., towels, food, etc.) and information on the customer (e.g., information such as a room number or a table location) through the input unit 542.

The controller 273 may display a serving request of the customer through the body display 540 or the head display 640. In addition, the manager may place an article requested by the customer on the tray 1100 of the serving module M, input the information on the customer (e.g., information such as a room number or a table location) provided with a serving service through the input unit 542, and input a movement command through the input unit 542.

The robot may move to a location of the customer according to preset programming, and after approaching the customer, the robot may operate the serving module M to serve the article to the customer.

The controller 273 may control the door driving device 1300 in the open mode to move the article to a position for serving the article to the customer (i.e., serving position P2), and may control the tray moving device 1400 in the serving mode.

The controller 273 may operate the tray moving device 1400 after operating the door driving device 1300 first, without operating the door driving device 1300 and the tray moving device 1400 simultaneously. When the door 1200 has been opened by the door driving device 1300, that is, when the door 1200 is rotated to the open position P4, the controller may control the tray moving device 1400 in the serving mode, and the tray 1100 may be moved through the tray entrance G in a state in which the tray entrance G is fully opened.

Meanwhile, when the robot includes the authentication module 1900, the controller 273 may control the door driving device 1300 in the open mode when the customer authentication is completed by the authentication module 1900, and control the tray moving device 1400 in the serving mode when the open mode of the door driving device 1300 is completed.

The customer may grab the article placed on the tray 1100, which is moved to the serving position P2, by a hand, and may input the completion of the serving service through the input unit 542.

The controller 273 may
control the tray moving device 1400 and the door driving device 1300 in a reverse order as compared a case for moving the tray 1100 to the serving position P2.

The controller 273 may first control the tray moving device 1400 in the protection mode so that the entire of the tray 1100 may be moved into the tray space S, and then control the door driving device 1300 in the close mode.

When the entire of the tray 1100 has been moved into the tray space S by the tray moving device 1400, the controller 273 may control the door driving device 1300 in the close mode, and the door 1200 may be rotated to the close position P3 to block the tray entrance G.

Meanwhile, the controller 273 may control at least one of the inner lighting device 1500 or the indicator 1600 during the operation of the door 1100 as described above.

When the door 1100 is opened, the controller 273 may turn on the inner lighting device 1500, and the inner lighting device 1500 may lighten the tray space S.

The controller 273 may control the indicator 1600 so that the lighting pattern formed by the indicator 1600 is changed during the operation of the door 1100. The controller 273 may control the indicator 1600 such that the lighting pattern is changed according to the door 1200.

When the door 1100 is opened or closed, the controller 273 may control the indicator 1600 in association with the door 1100.

During the operation of the door 1100, the controller 273 may control the light sources 1612 such that the indicator 1600 emits light in a predetermined lighting pattern (or light pattern).

A lighting pattern LP formed by the light sources 1612 may become larger or smaller in size according to the position of the door 1200, and a position of the lighting pattern LP may be changed according to the position of the door 1200.

The controller 273 may control the indicator 1600 such that the lighting pattern formed by the indicator 1600 is formed along a movement position of the door 1200.

The controller 273 may control the indicator 1600 such that the light sources 1612 of the indicator 1600 are sequentially turned on or sequentially turned off in a moving direction of the door 1200.

All the light sources 1612 may be turned on, and then the light sources 1612 may be sequentially turned off along the movement position of the door 1200. All the light sources 1612 may be turned off,
and then the light sources 1612 may be sequentially turned on along the movement position of the door 1200.

The controller 273 may not change the lighting pattern when the door 1100 is stopped, and may change the lighting pattern in association with the door 1100 when the door 1100 is operated.

When the controller 273 sequentially turns on or off the light sources 1612, lighting patterns LP and LP' formed by the indicator 1600 may be changed in size in a moving direction R of the door 1200 as shown in FIGS. 15A and 15B.

As one example, as shown in FIG. 15A, all the light sources 1612 may be may be maintained in an ON state when the door 1200 is at the close position, and as shown in FIG. 15B, the light sources 1612 may be sequentially turned off in a direction parallel to an opening direction of the door when the door 1200 is rotated in the opening direction of the door 1200. In this case, the size of the lighting pattern formed by the indicator 1600 may be gradually decreased in the opening direction of the door 1200. (LP->LP')

As another example, all the light sources may be maintained in an OFF state when the door 1200 is at the open position, and the light sources 1612 may be sequentially turned on in a direction parallel to a closing direction of the door 1200 when the door 1200 is rotated in the closing direction of the door 1200. In this case, the size of the lighting pattern formed by the indicator 1600 may be gradually increased in the closing direction of the door. (LP'->LP)

The controller 273 may control the indicator 1600 such that the light sources 1612 of the indicator 1600 are sequentially turned on and then turned off in the moving direction of the door 1200. In this case, the light sources 1612 may not be simultaneously turned on, and a position of the light source 1612 which is turned on or off may be changed in the moving direction R of the door 1200.

Figure 16:
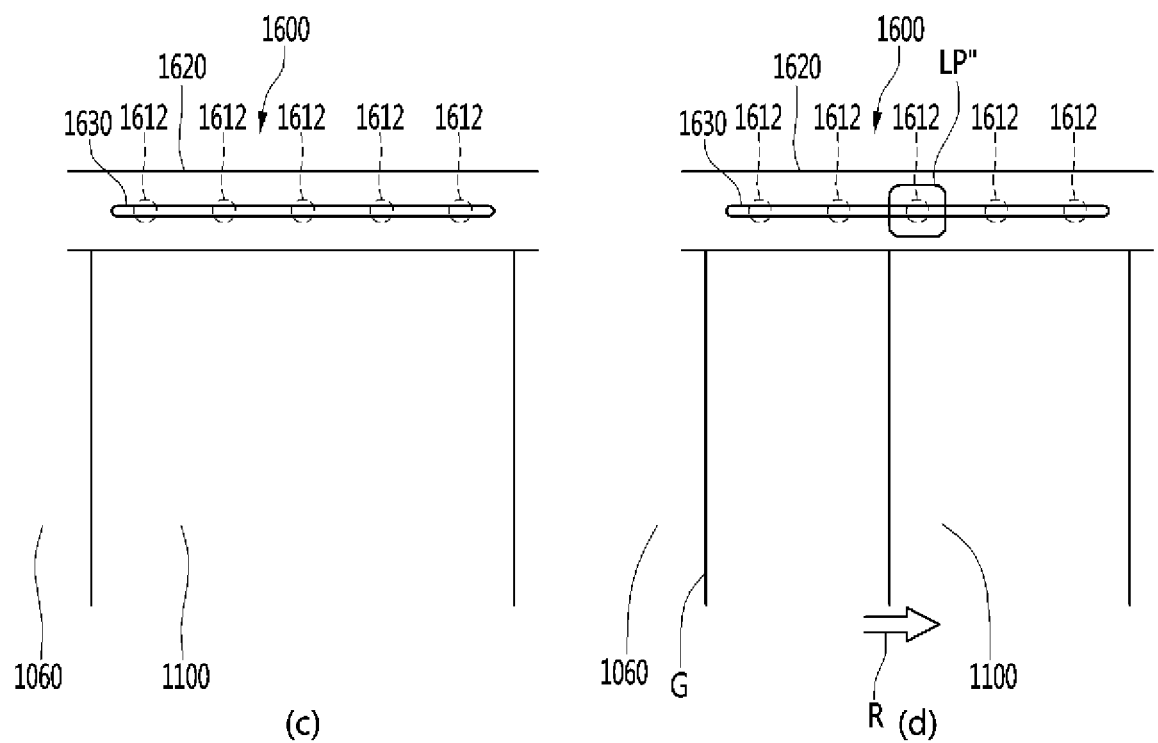
FIG. 16 is a view showing one example of the lighting pattern formed in the serving module according to the embodiment.

For example, as shown in FIG. 16C, all the light sources 1612 may be maintained in the OFF state when the door 1200 is at the close position P3, and the light sources 1612 may be sequentially turned on and then turned off in the direction parallel to the opening direction of the door when the door 1200 is rotated in the opening direction of the door 1200.

All the light sources 1612 may be maintained in the OFF state when the door 1200 is at the open position P4, and the light sources 1612 may be sequentially turned on and then turned off in the direction parallel to the closing direction of the door 1200 when the door 1200 is rotated in the closing direction of the door 1200.

When the light sources 1612 are sequentially turned on and then turned off, the light sources 1612 may be turned on and then turned off in a unit of a predetermined number (e.g., one or two) of light sources 1612, and the lighting pattern LP" (see FIG. 16B) formed by the indicator 1600 may be configured such that a position of the lighting pattern LP" is gradually moved in the moving direction R of the door 1200 while keeping the size thereof.

Meanwhile, the serving module M of the present embodiment is not limited to a case where the serving module M is mounted on the moving module 1 for use, and the serving module M may be provided at a specific location of accommodations such as a hotel or restaurants such as a cafeteria to provide an article to the customer authenticated through the authentication module 1900.

As described above, the technical idea of the present disclosure has been described for illustrative purposes, and various changes and modifications can be made by those of ordinary skill in the art to which the present disclosure pertains without departing from the essential characteristics of the present disclosure.

Therefore, the embodiments disclosed in the present disclosure are not intended to limit the technical idea of the present disclosure but to describe the technical idea of the present disclosure, and the scope of the technical idea of the present disclosure is not limited by the embodiments.

The scope of the present disclosure should be defined by the appended claims, and should be construed as encompassing all technical ideas within the scope of equivalents thereof.

The invention claimed is:

1. A serving module, comprising:
   a tray;
   a main body having a tray receiving space configured to accommodate the tray therein, the main body having a tray entrance in communication with the tray receiving space;
   a door configured to open and close the tray entrance;
   a door driver connected to the door to open and close the door; and
   an indicator located on the main body, the indicator being configured to change a lighting pattern according to a moving direction of the door during an operation of the door,
   wherein the indicator includes a plurality of light sources, and
   wherein the light sources are sequentially turned on or off along the moving direction to indicate the moving direction of the door.

2. The serving module according to claim 1, further comprising an inner light to emit light into the tray receiving space when the door is opened.

3. A serving module, comprising:
   a tray;
   a main body having a tray receiving space configured to accommodate the tray therein, the main body having a tray entrance in communication with the tray receiving space;
   a door configured to open and close the tray entrance;
   a door driver connected to the door to open and close the door; and
   an indicator located on the main body, the indicator being configured to change a lighting pattern according to a moving direction of the door during an operation of the door,
   wherein the indicator includes a plurality of light sources, and
   wherein the light sources are sequentially turned on and then turned off along the moving direction to indicate the moving direction of the door.

* * * * *